USO10901571B2

(12) United States Patent
Matsuzoe et al.

(10) Patent No.: US 10,901,571 B2
(45) Date of Patent: Jan. 26, 2021

(54) VISUAL FIELD GUIDANCE METHOD, COMPUTER-READABLE STORAGE MEDIUM, AND VISUAL FIELD GUIDANCE APPARATUS

(71) Applicant: FUJITSU LIMITED, Kawasaki (JP)

(72) Inventors: Shizuko Matsuzoe, Atsugi (JP); Shan Jiang, Zama (JP); Junya Fujimoto, Atsugi (JP); Keiju Okabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 409 days.

(21) Appl. No.: 15/277,025

(22) Filed: Sep. 27, 2016

(65) Prior Publication Data

US 2017/0090722 A1 Mar. 30, 2017

(30) Foreign Application Priority Data

Sep. 30, 2015 (JP) ................................. 2015-195040

(51) Int. Cl.
*G06F 3/0481* (2013.01)
*G06F 3/0346* (2013.01)
(Continued)

(52) U.S. Cl.
CPC .......... *G06F 3/04817* (2013.01); *G06F 3/011* (2013.01); *G06F 3/04812* (2013.01); *G06F 9/453* (2018.02)

(58) Field of Classification Search
CPC ............. G06F 3/04817; G06F 3/04812; G06F 3/0346; G06F 3/016
See application file for complete search history.

(56) References Cited

U.S. PATENT DOCUMENTS 9,243,913 B1 * 1/2016 Lehman ................. G01C 21/20
9,791,919 B2 * 10/2017 Lyren ..................... G06F 3/011
(Continued)

FOREIGN PATENT DOCUMENTS

JP 2004-220179 8/2004
JP 2007-133464 A 5/2007
(Continued)

OTHER PUBLICATIONS

Shunichi Kasahara et al., "JackIn: Integrating First-Person View with Out-of-Body Vision Generation for Human-Human Augmentation (AH2014)" [online], May 29, 2015, Internet <URL:https://vimeo.com/88523949>, pp. 1-8 (Total 8 pages).
(Continued)

*Primary Examiner* — Shourjo Dasgupta
(74) *Attorney, Agent, or Firm* — Fujitsu Patent Center

(57) ABSTRACT

A guidance support method is disclosed. Target information is detected in space information stored in a storage device. A device position of a display device is measured in a space defined in the space information and a target position of a target defined in the target information. An icon position of an icon to display is determined at the display device and a movement of the icon based on the device position and the target position, which are measured. The icon moving as determined at the icon position displayed is displayed at the display device as determined. The icon position and the movement of the icon displayed at the display device is changed depending on a change of the device position.

15 Claims, 39 Drawing Sheets

(51) Int. Cl.
*G06F 3/01* (2006.01)
*G06F 9/451* (2018.01)

(56) References Cited

U.S. PATENT DOCUMENTS

| | | | | |
|---|---|---|---|---|
| 2009/0122018 | A1* | 5/2009 | Vymenets | G06F 3/04817 345/173 |
| 2009/0322695 | A1* | 12/2009 | Cho | G06F 3/0416 345/173 |
| 2011/0109541 | A1* | 5/2011 | Kitagawa | B60K 35/00 345/156 |
| 2011/0316767 | A1* | 12/2011 | Avrahami | A63F 3/00094 345/156 |
| 2013/0083003 | A1* | 4/2013 | Perez | A63F 13/422 345/419 |
| 2013/0172016 | A1* | 7/2013 | Ooka | G01C 21/3438 455/456.3 |
| 2013/0182011 | A1 | 7/2013 | Ryu et al. | |
| 2014/0149903 | A1* | 5/2014 | Ahn | G06F 3/0488 715/765 |
| 2014/0208273 | A1* | 7/2014 | Moffett | G06F 3/033 715/856 |
| 2014/0225812 | A1* | 8/2014 | Hosoya | G06F 3/04815 345/8 |
| 2014/0300466 | A1* | 10/2014 | Park | G08B 19/00 340/539.11 |
| 2015/0070347 | A1* | 3/2015 | Hofmann | G06T 19/006 345/419 |
| 2015/0202962 | A1* | 7/2015 | Habashima | B60K 35/00 345/633 |
| 2016/0055676 | A1* | 2/2016 | Kasahara | G06F 3/048 345/633 |
| 2016/0109709 | A1* | 4/2016 | Osterhout | G06F 3/013 359/614 |
| 2017/0249745 | A1* | 8/2017 | Fiala | G06T 7/246 |
| 2017/0300212 | A1* | 10/2017 | Vinna | G06F 3/04817 |

FOREIGN PATENT DOCUMENTS

| | | |
|---|---|---|
| JP | 2013-518275 A | 5/2013 |
| WO | 2014/162825 A1 | 10/2014 |

OTHER PUBLICATIONS

Toshikazu Kimuro et al. "Adaptive visual effect for multi-display environment using head pose", IEICE Technical Report, HIP2006-135 106(610) Mar. 2007, pp. 43-48, Mar. 16, 2007. Cited in JPOA dated Mar. 26, 2019 issued with respect to the basic Japanese patent application No. 2015-195040.

JPOA—Office Action dated Mar. 26, 2019 issued with respect to the basic Japanese Patent Application No. 2015-195040, with full machine English translation..

JPOA—Office Action dated Jun. 25, 2019 issued with respect to the basic Japanese Patent Application No. 2015-195040 with full machine translation. **Reference WO2014/162825 and Non-patent literature cited in the JPOA were previously submitted in the IDS filed on Apr. 16, 2019 and dated Mar. 26, 2019, respectively.

* cited by examiner

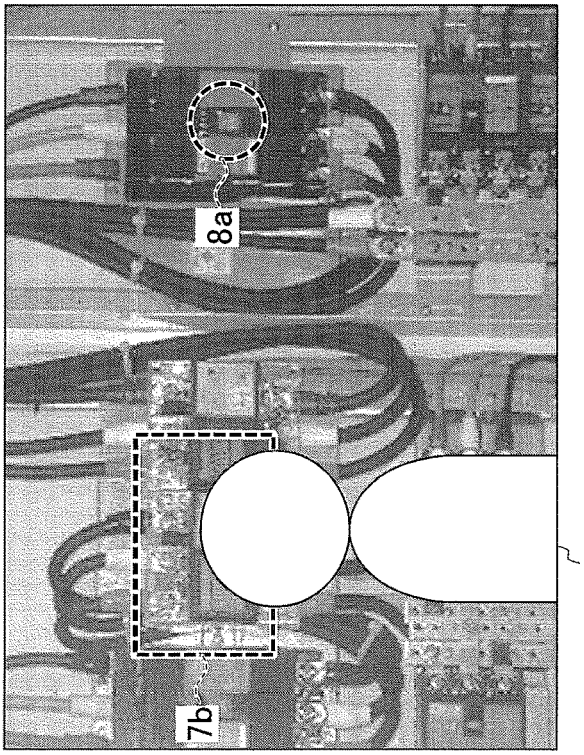
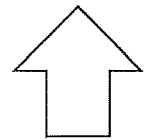
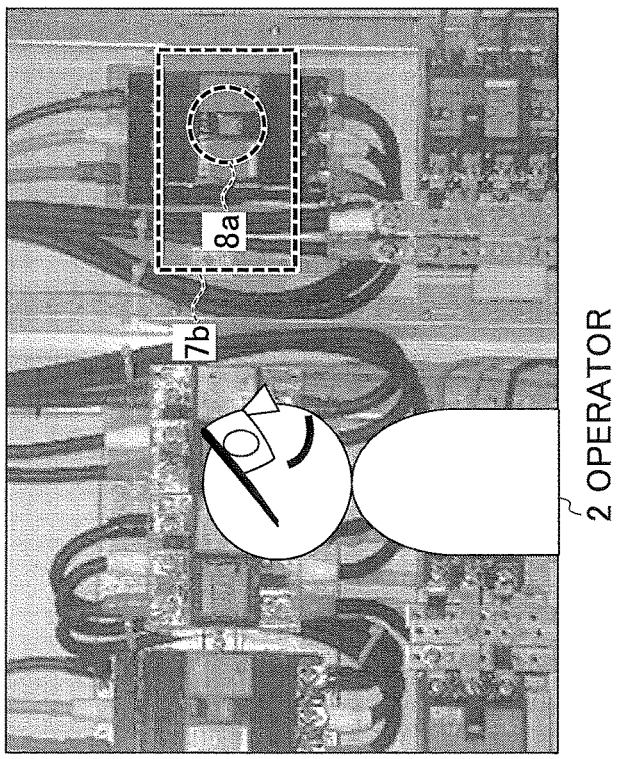
FIG.3A
FIG.3B

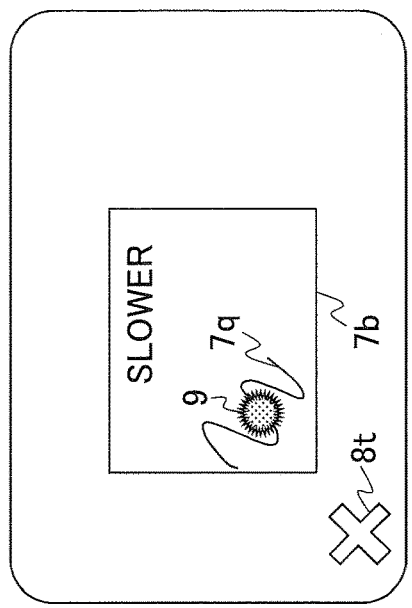
FIG.4B
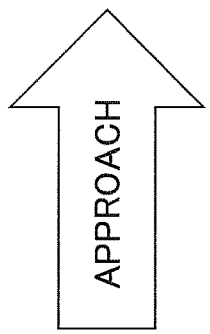
APPROACH
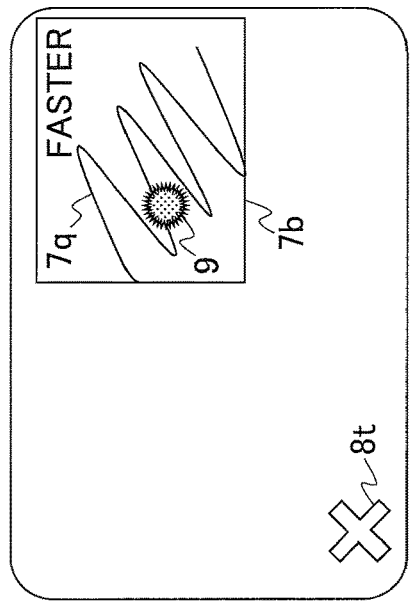
FIG.4A

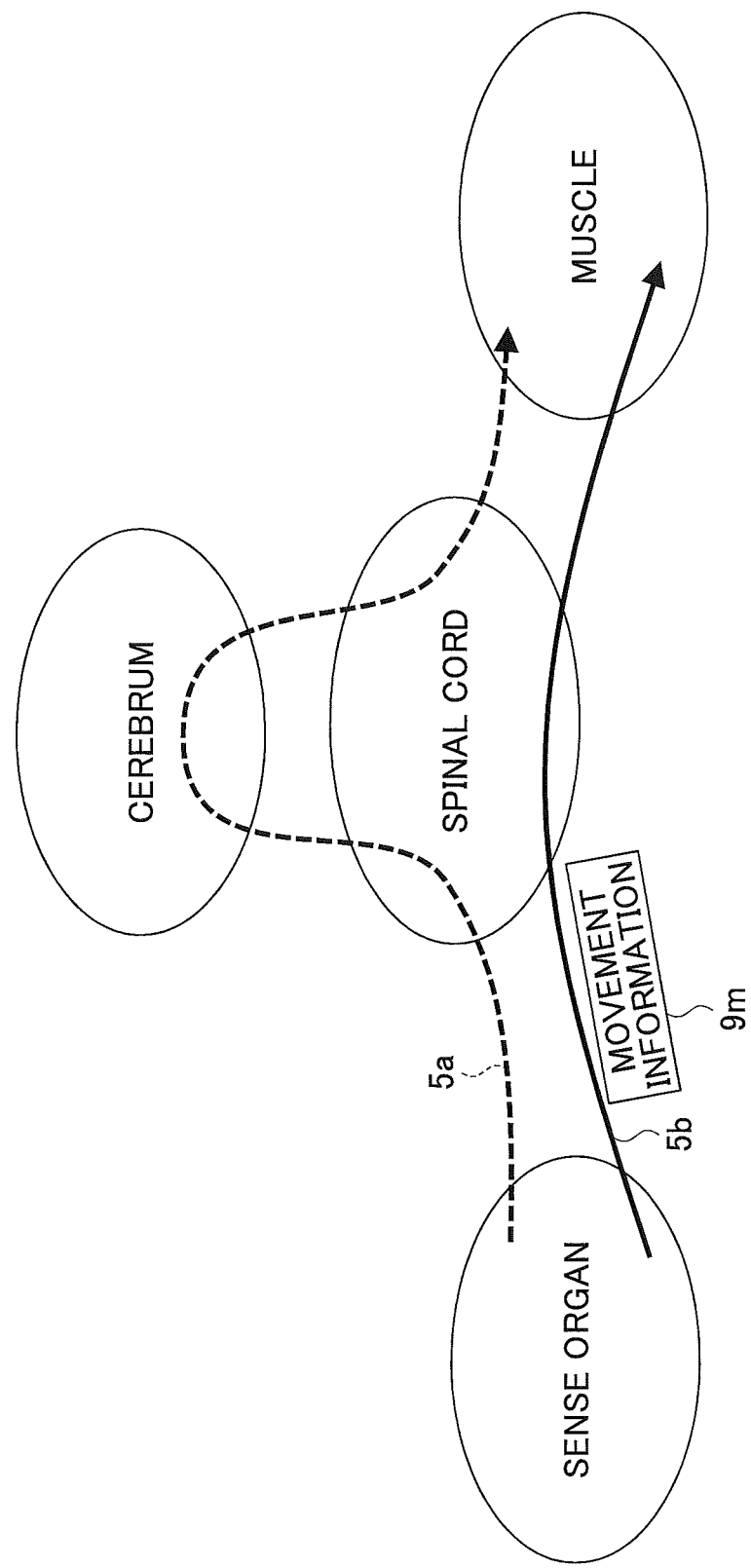

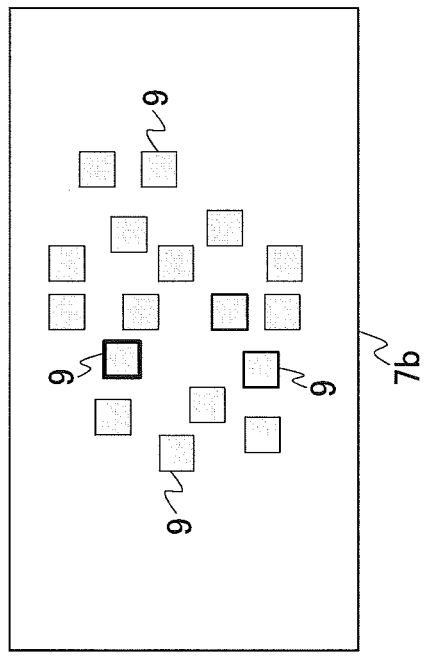
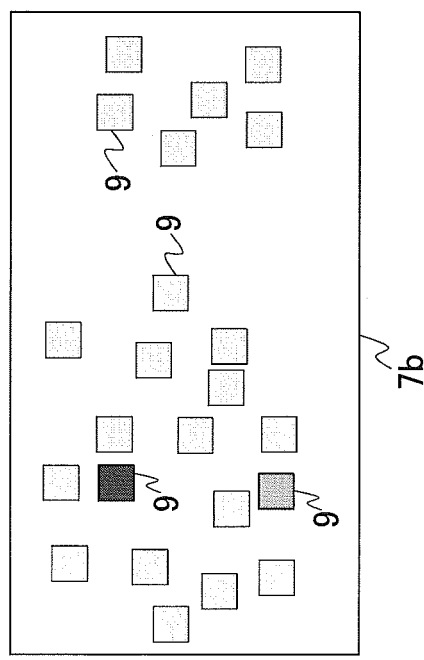

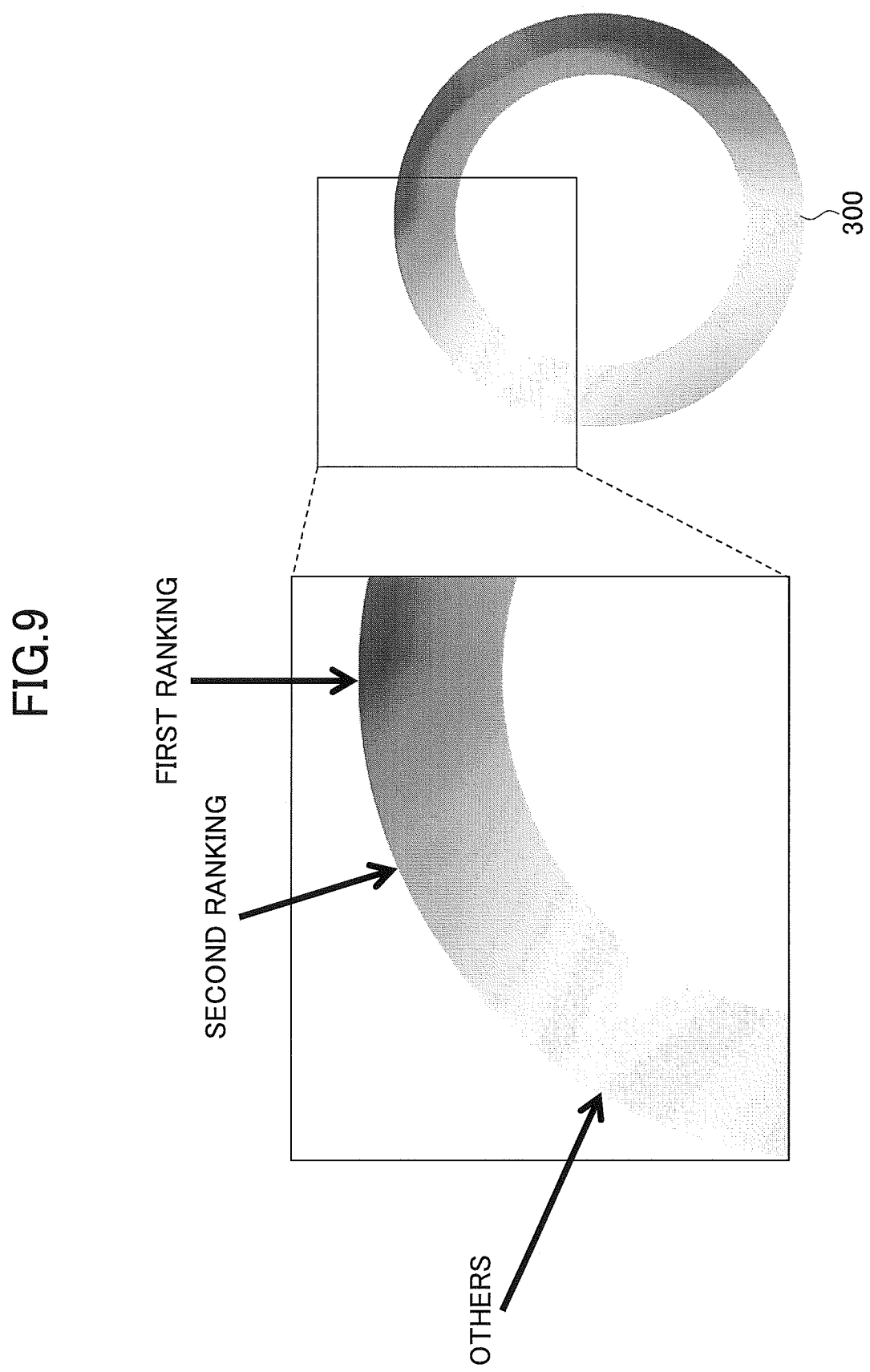

FIG.11

DATA SET A

| INSTRUCTION ID | CONTENT POSITION | PRIORITY |
|---|---|---|
| T1 | (x1, y1) | Priority-T1 |
| T2 | (x2, y2) | Priority-T2 |
| ... | ... | ... |
| Tn | (xn, yn) | Priority-Tn |

DATA SET A'

| INSTRUCTION ID | CONTENT POSITION | PRIORITY | GUIDANCE ICON DRAWING POSITION | DISTANCE TO TARGET |
|---|---|---|---|---|
| T1 | (x1, y1) | Priority-T1 | (Gix1, Giy1) | L-T1 |
| T2 | (x2, y2) | Priority-T2 | (Gix2, Giy2) | L-T2 |
| ... | ... | ... | ... | ... |
| Tn | (xn, yn) | Priority-Tn | (Gixn, Giyn) | L-Tn |

DATA SET A"

| INSTRUCTION ID | CONTENT POSITION | PRIORITY | GUIDANCE ICON DRAWING POSITION | DISTANCE TO TARGET | ICON VISUAL EFFECT PARAMETERS |
|---|---|---|---|---|---|
| T1 | (x1, y1) | Priority-T1 | (Gix1, Giy1) | L-T1 | (gipT1, ppT1) |
| T2 | (x2, y2) | Priority-T2 | (Gix2, Giy2) | L-T2 | (gipT2, ppT2) |
| ... | ... | ... | ... | ... | ... |
| Tn | (xn, yn) | Priority-Tn | (Gixn, Giyn) | L-Tn | (gipTn, ppTn) |

FIG.12

DATA SET B

| INSTRUCTION ID | CONTENT POSITION | CONTENT DETAIL |
|---|---|---|
| T1 | (x1, y1) | Content-T1 |
| T2 | (x2, y2) | (NOT CHANGED) |
| ⋮ | ⋮ | ⋮ |
| Tn | (xn, yn) | Content-Tn |

DATA SET B'

| INSTRUCTION ID | CONTENT POSITION | CONTENT DETAIL |
|---|---|---|
| T1 | (x1, y1) | Content-T1 |
| T2 | (x2, y2) | Content-T2 |
| ⋮ | ⋮ | ⋮ |
| Tn | (xn, yn) | Content-Tn |

DATA SET B"

| INSTRUCTION ID | CONTENT POSITION | CONTENT DETAIL | CONTENT DRAWING POSITION |
|---|---|---|---|
| T1 | (x1, y1) | Content-T1 | (Cx1, Cy1) |
| T2 | (x2, y2) | Content-T2 | (Cx2, Cy2) |
| ⋮ | ⋮ | ⋮ | ⋮ |
| Tn | (xn, yn) | Content-Tn | (Cxn, Cyn) |

FIG.18A
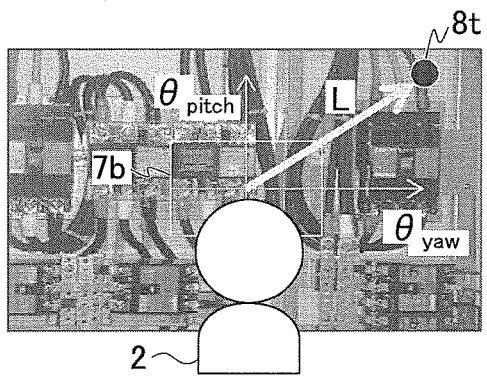 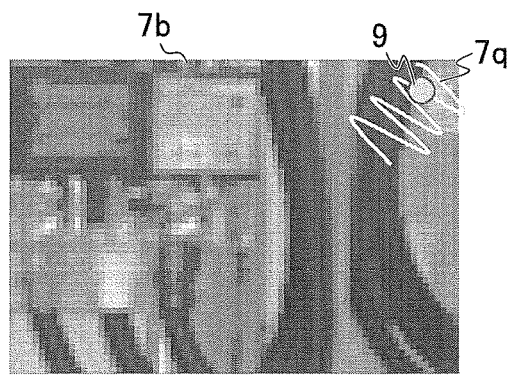
FIG.18B
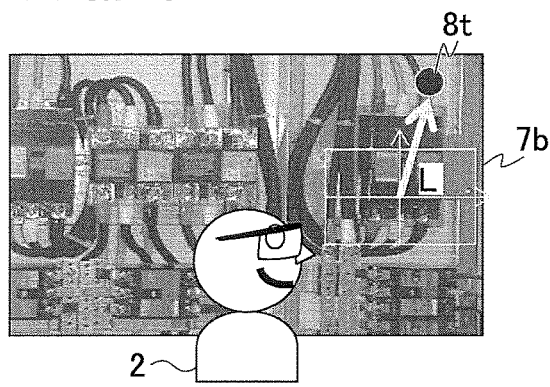 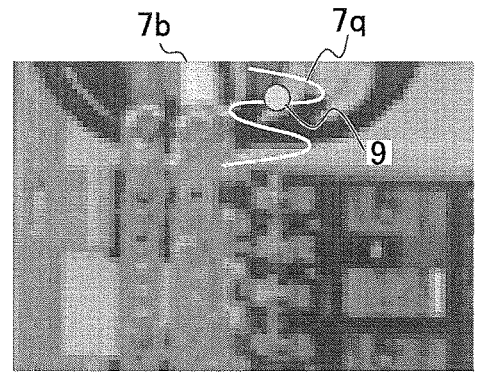
FIG.18C
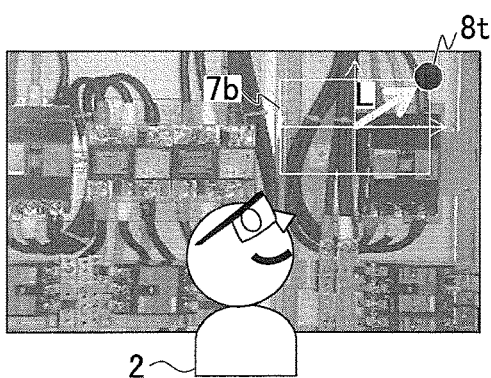 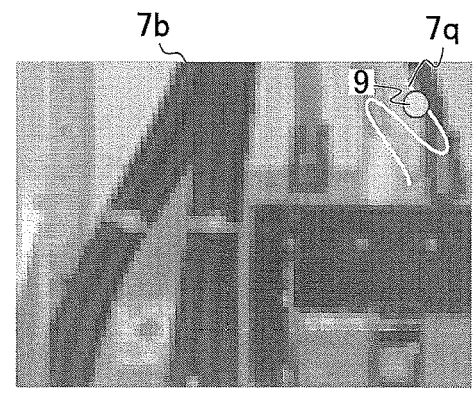

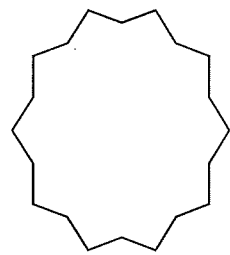 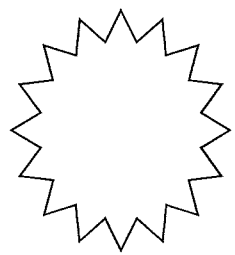 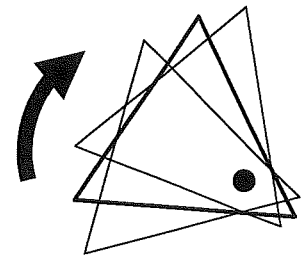
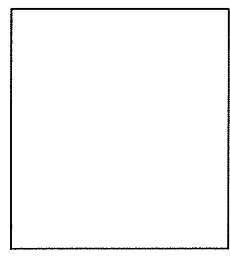 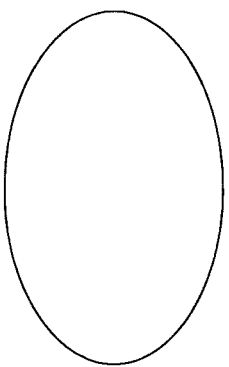 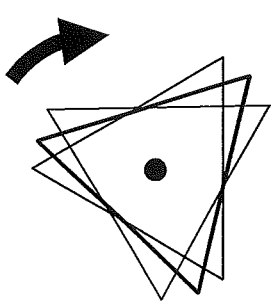
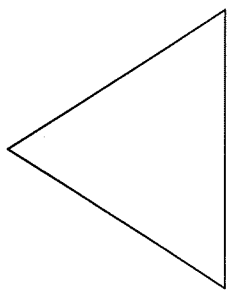 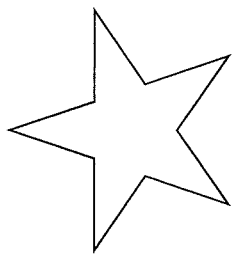 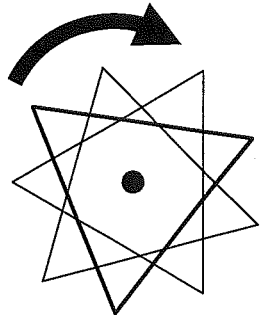
FIG.27A
FIG.27B

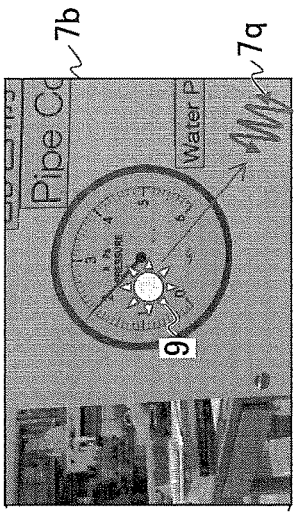
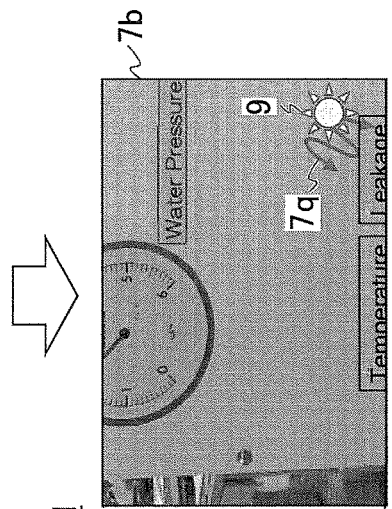
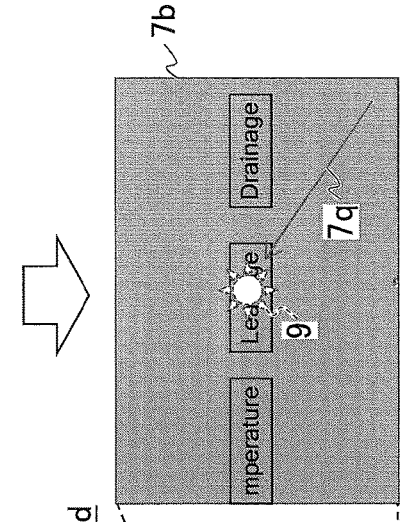
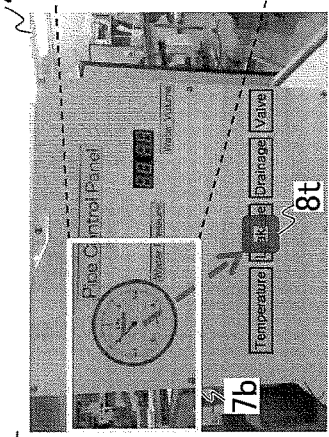
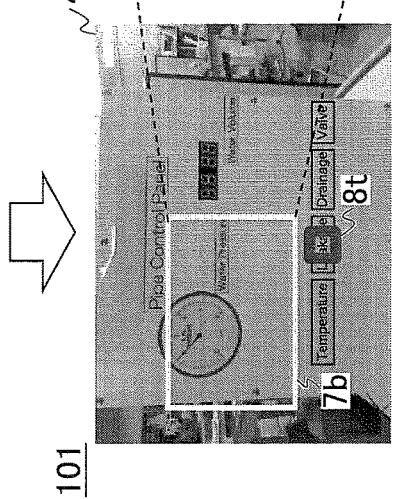
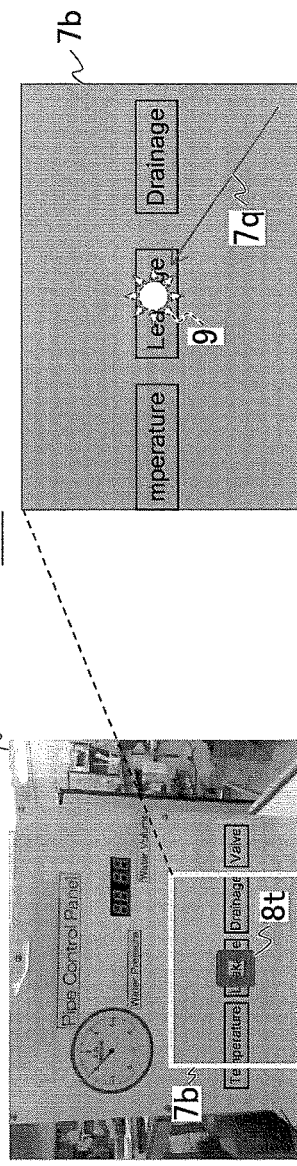
FIG.30A　　FIG.30B　　FIG.30C

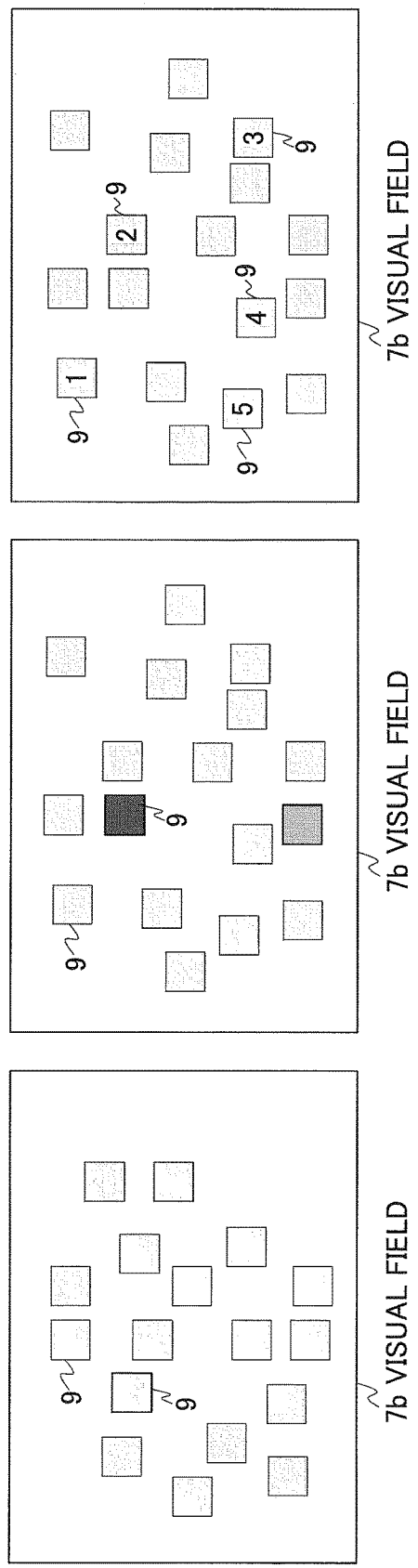

US 10,901,571 B2

VISUAL FIELD GUIDANCE METHOD, COMPUTER-READABLE STORAGE MEDIUM, AND VISUAL FIELD GUIDANCE APPARATUS

CROSS-REFERENCE TO RELATED APPLICATIONS

This application is based upon and claims the benefit of priority of the prior Japanese Patent Application No. 2015-195040, filed on Sep. 30, 2015, the entire contents of which are incorporated herein by reference.

FIELD

The embodiments discussed herein are related to a visual field guidance method, a computer-readable storage medium having stored therein a visual field guidance program, and a visual field guidance apparatus.

BACKGROUND

Recently, due to influence of social issues such as a declining birthrate and the like, in various jobs (such as maintenance, inspection, and the like of a factory or a plant), a problem of a labor shortage and a problem of a fostering of on-site engineers have been raised. In order to solve these problems, a remote operation support system has been expected to improve efficiency of an operation at a work site.

One technology has been provided to guide toward an object outside a visual field at a terminal mounted on an operator at the work site, by navigation using Augmented Reality (AR) technology.

PATENT DOCUMENTS

[Patent Document 1] Japanese Patent No. 5324714
[Patent Document 2] Japanese Laid-open Patent Publication No. 2007-133464

Non-Patent Document

[Non-Patent Document 1] Shunichi Kasahara and Jun Rekimoto, "JackIn: Integrating First-Person View with Out-of-Body Vision Generation for Human-Human Augmentation (AH2014)" [online], May 29, 2015, Internet <URL:https://vimeo.com/88523949>

SUMMARY

According to one aspect of the embodiments, there is provided a guidance support method including: detecting, by a computer, target information in space information stored in a storage device; measuring, by the computer, a device position of a display device in a space defined in the space information and a target position of a target defined in the target information; determining, by the computer, an icon position of an icon to display at the display device and a movement of the icon based on the device position and the target position, which are measured; displaying, by the computer, the icon moving as determined at the icon position displayed at the display device as determined; and changing, by the computer, the icon position and the movement of the icon displayed at the display device depending on a change of the device position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A and FIG. 3B are diagrams for explaining an example of a case in which the target exists outside the visual field of the operator;

FIG. 4A and FIG. 4B are diagrams for explaining an example of a guidance icon representing three guidance elements;

FIG. 5 is a diagram for explaining a difference between information transmissions;

FIG. 8A and FIG. 8B are diagrams illustrating examples of making eye attractivity higher due to other features of the visual effect;

FIG. 9 is a diagram illustrating an example in a case of distinguishing a priority due to hue;

FIG. 11 is a diagram illustrating a data structure example of data set A;

FIG. 12 is a diagram illustrating a data structure example of data set B;

FIG. 18A through FIG. 18C are diagrams for explaining a behavior example of the guidance icon in the first embodiment;

FIG. 27A and FIG. 27B are diagrams illustrating examples of shapes and rotations of the guidance icon;

FIG. 30A through FIG. 30C are diagrams illustrating a movement example of the guidance icon in the eighth embodiment;

FIG. 38A through FIG. 38C are diagrams illustrating other display examples of the priority for multiple guidance icons.

DESCRIPTION OF EMBODIMENTS

Figure 1:
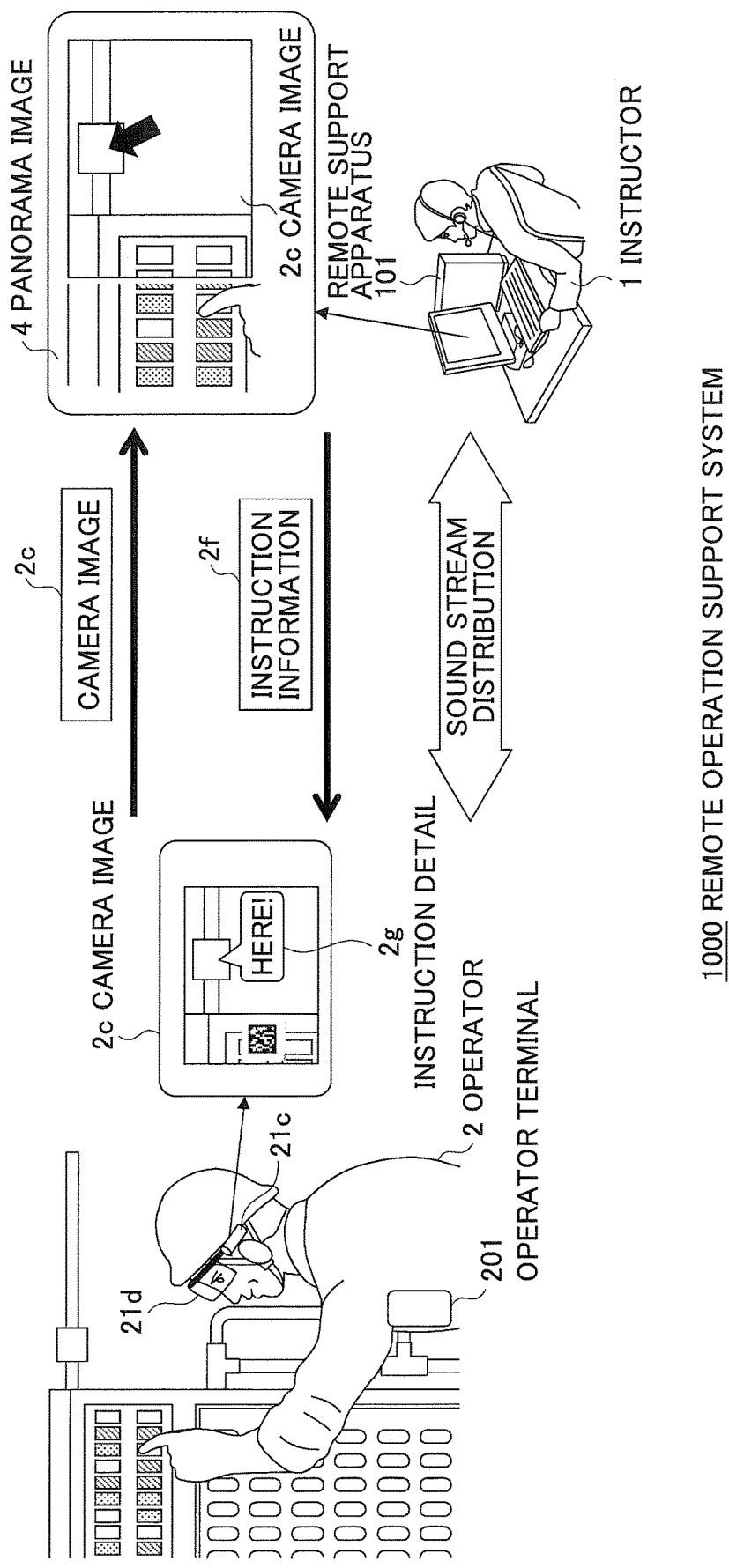
FIG. 1 is a diagram for explaining an example of a remote operation support system.

In usage of the above described technology for guiding an operator toward an object outside a visual field at a terminal of an operator at a work site, there is a case in which a target to operate does not exist in a visual field range of the operator working at the work site. In this technology, it is difficult for the operator to intuitively comprehend a position, a direction, a distance, and the like of the target.

The following embodiments described below will present a technology for smoothly guiding an operator as a user to the target.

Preferred embodiments of the present invention will be described with reference to the accompanying drawings. First, a technology for guiding the operator to a guidance target (simply, called "target") by a navigation using an Augmented Reality (AR) will be described.

In a Patent Document 1, by functions of a terminal possessed by a user, a current location, a posture, and a visual field of the user are calculated, an object outside the visual field is retrieved from a database by using the calculated information items. After that, object information (indicating the direction and the distance) closer to a visual boundary is displayed on a screen.

In this technology, multiple objects are assumed, a distance from the current location is used as an index, and a closer subject is selected as the object by displaying information on the screen. Also, a size of the object is changed based on the index so as to distinguishably display.

In order to comprehend the position, the direction, and the distance of the guidance target, multiple information items (such as an arrow, a numerical value, a building name, and the like) are referred to, and its content is understood for each of the information items.

A human has a memory limit. When a number of targets to pay attention is increased, or when a number of cases of understanding contents of information, which causes a large number of in-brain processes, is increased, attentiveness and storage areas in the brain are consumed. This indicates a state in which a large cognitive load is applied. As a result, a cognitive process pertinent to other information is stopped. When a certain operation is conducted, and the larger cognitive load is applied, the entire operation may be prolonged.

In a case of using the technology disclosed in the Patent Document 1, the operator pays attention to multiple information items, distinguishes which information item represents what. Then, the multiple information items are individually processed in the brain. Text information is processed in the left brain, and a picture and graphics are processed in the right brain. Accordingly, a large number of process steps are conducted. Also, the left brain, which is good at logical thinking such as the text information, is considered to have an in-brain process speed and allowable range of an allowable memory capacity lower than those of the right brain. As described above, since a large cognitive load is applied to the user of the terminal, a longer time may be consumed for visual guidance.

In a Patent Document 2, an image to display is divided into a building area, a road area, and a vacant area. By disposing an icon in the vacant area, visibility of the target and the icon is improved.

However, in the Patent Document 2, the target is limited to be in the visual field, and the icon being displayed does not represent the direction and the distance of the target outside the visual field.

In the Non-Patent Document 1, the visual field of the operator mounting a Head Mounted Display (HMD) is guided to see an operation target. As position information of the operation target, to which the operator is guided, an arrow (indicating a direction of target to guide) and a curvature of an arc (the distance to the guidance target: the greater the curvature is, the shorter the distance is) are used.

In the Non-Patent Document 1, the direction and the distance to the target is represented. When the distance from a current location to the guidance target is longer, it is difficult to see a change of the curvature of the arc, and it is difficult to promptly comprehend a remaining distance to the guidance target. That is, when the curvature becomes greater, the arc displayed at the HMD becomes a small portion of the entire circle, and is seen as an approximately straight line. It is difficult to solve a factor to which the cognitive load is applied.

The embodiments provides a visual field guidance method, a computer-readable storage medium having stored therein a visual field guidance program, and a visual field guidance apparatus, to present a user such as the operator or the like three elements of a progress level: the direction, the distance, and guidance, by moving a vibratory icon in the visual field.

In the following, as described in FIG. 1, in a remote operation support system 1000, in which an instructor 1 gives an instruction to an operator 2 working at a work place, a case of conducting a visual field 7b guidance will be described. The embodiments may be applied but is not limited to a case to collectively display, at the same time from a remote place, the three elements of the progress level:

the direction, the distance, and the guidance toward the target outside the visual field 7b (hereinafter, called are "three guidance elements").

FIG. 1 is a diagram for explaining an example of the remote operation support system. In the remote operation support system 1000 in FIG. 1, a case, in which the operator 2 such as a new worker works in accordance with an instruction from an instructor 1 who is a person of experience for the work site, is depicted.

The operator 2 at the work site possesses an operator terminal 201, and wears a display device 21d and a camera 21c. The operator terminal 201 may be connected to each of the display device 21d and the camera 21c via short distance radio communication such as Bluetooth (registered trademark) or the like.

A camera image 2c, which is captured by the camera 21c of the operator 2, is sent as a state of the work site to the remote support apparatus 101 of the instructor 1 being at the remote place, by a wireless network communication function of the operator terminal 201. A voice of the operator 2 may be sent with the camera image 2c. A range depicted by the camera image 2c corresponds to the visual field 7d, which will be described later. In the following, the visual field 7d is described as a range where the image of a latest camera image 2c is depicted.

The remote support apparatus 101 is operated by the instructor 1. The remote support apparatus 101 generates a panorama image 4 from the camera image 2c sent from the operator terminal 201 at a remote area, and displays the panorama image 4. The instructor 1 comprehends a state of a remote work site from the panorama image 4 displayed at the remote support apparatus 101. The panorama image 4 is updated by the camera image 2c every time of receiving the camera image 2c.

The instructor 1 may click a location desired to indicate in the panorama image 4. The remote support apparatus 101 sends the instruction information 2f including location information clicked by the instructor 1, an instruction detail 2g, and the like in the camera image 2c, to the operator terminal 201 of the operator 2.

The display device 21d displays the instruction detail 2g by a visual annotation based on the instruction information 2f, which the operator terminal 201 has received.

The operator terminal 201 is regarded as an information processing terminal such as a smart device or the like, and includes various communication functions. The display device 21d may be a device such as the HMD, which is wearable and capable of input and output voice.

The camera 21c may be a device such as a head mounted camera (HMC), which is wearable and a micro camera such as a Charge Coupled Device (CCD).

The display device 21d and the camera 21c are mounted on the head of the operator 2, and are capable of communicating with the operator terminal 201 via the short distance radio communication or the like.

At the work site, the camera image 2c, which indicates a work environment that the camera 21c of the operator 2 has captured, is transmitted to the remote support apparatus 101. The camera image 2c is displayed at the remote support apparatus 101.

When the instructor 1 inputs the instruction detail 2g on the camera image 2c displayed at the remote support apparatus 101, the instruction information 2f is sent to the operator terminal 201. When receiving the instruction information 2f, the operator terminal 201 displays the instruction detail 2g at the indicated location specified by the instruction information 2f.

On the other hand, voice communication is available between the operator 2 and the instructor 1. A sound stream is distributed between the operator terminal 201 and the remote support apparatus 101.

Figure 2:
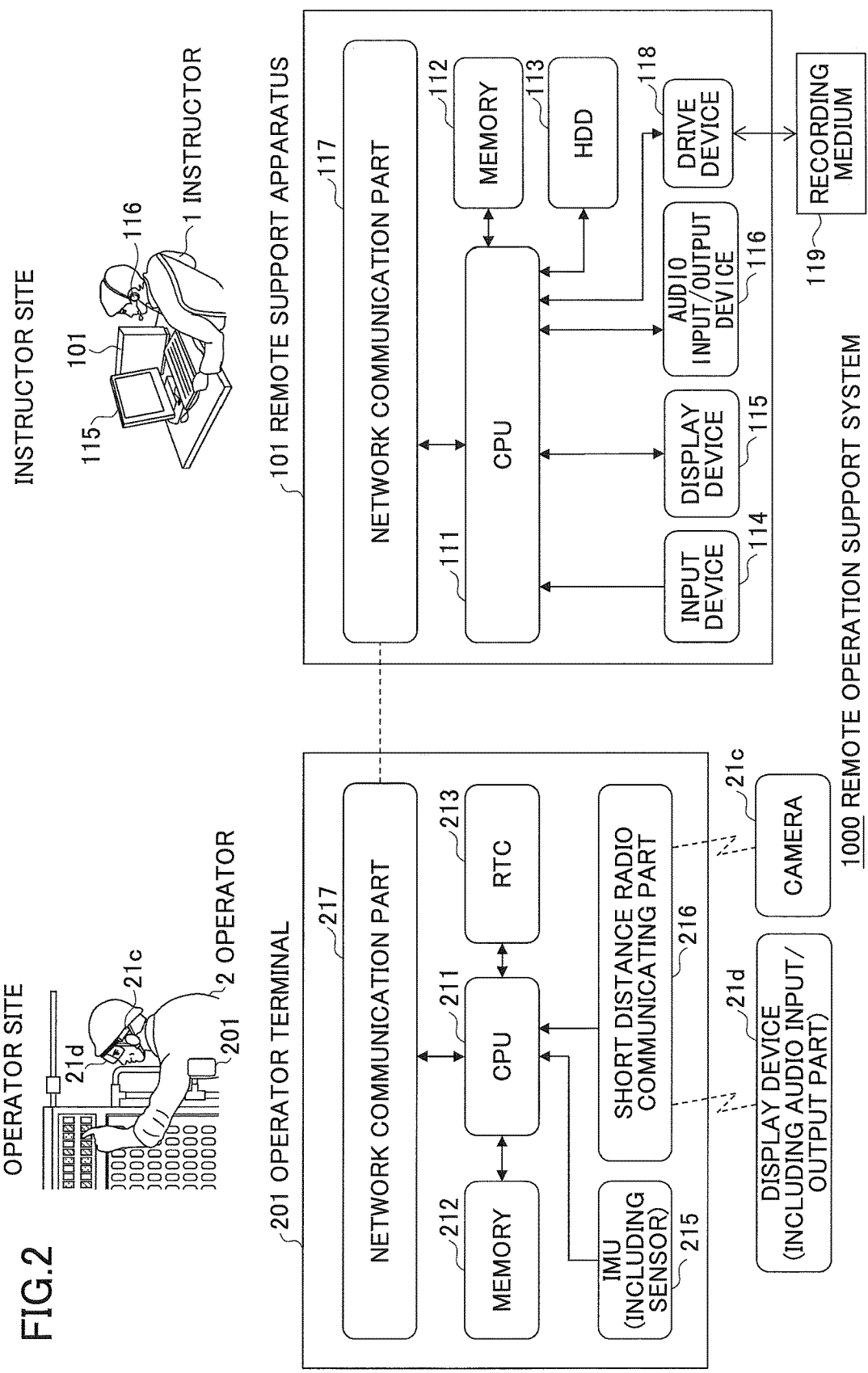
FIG. 2 is a diagram illustrating a hardware configuration of the remote operation support system.

FIG. 2 is a diagram illustrating a hardware configuration of the remote operation support system. In the remote operation support system 1000, the remote support apparatus 101 includes a Central Processing Unit (CPU) 111, a memory 112, a Hard Disk Drive (HDD) 113, an input device 114, a display device 115, an audio input/output device 116, a network communication part 117, and a drive device 118. At least one of the memory 112 and the Hard Disk Drive (HDD) 113 corresponds to a storage device.

The CPU 111 corresponds to a processor that controls the remote support apparatus 101 in accordance with a program stored in the memory 112. A Random Access Memory (RAM), a Read Only Memory (ROM), and the like are used as the memory 112. The memory 112 stores or temporarily stores the program executed by the CPU 111, data used in a process of the CPU 111, data acquired in the process of the CPU 111, and the like.

The HDD 113 is used as an auxiliary storage device, and stores programs and data to perform various processes. A part of the program stored in the HDD 113 is loaded into the memory 112, and is executed by the CPU 111. Then, the various processes are realized.

The input device 114 includes a pointing device such as a mouse, a keyboard, and the like, and is used by the instructor 1 to input various information items for the process conducted in the remote support apparatus 101. The display device 115 displays various information items under control of the CPU 111. The input device 114 and the display device 115 may be integrated into one user interface device such as a touch panel or the like.

The audio input/output device 116 includes a microphone for inputting the audio sound such as voice and a speaker for outputting the audio sound. The network communication part 117 performs a wireless or wired communication via a network. Communications by the network communication part 117 are not limited to wireless or wired communications.

The program for realizing the process performed by the remote support apparatus 101 may be provided by a recording medium 119 such as a Compact Disc Read-Only Memory (CD-ROM).

The drive device 118 interfaces between the recording medium 119 (the CD-ROM or the like) set into the drive device 118 and the remote support apparatus 101.

Also, the recording medium 119 stores the program which realizes various processes according to a first embodiment which will be described later. The program stored in the recording medium 119 is installed into the remote support apparatus 101. The installed program becomes executable by the remote support apparatus 101.

It is noted that the recording medium 119 for storing the program is not limited to the CD-ROM. The recording medium 119 may be formed of a non-transitory or tangible computer-readable recording medium including a structure. In addition to the CD-ROM, a portable recording medium such as a Digital Versatile Disk (DVD), a Universal Serial Bus (USB) memory, a semiconductor memory such as a flash memory, or the like may be used as the computer-readable recording medium 119.

The operator 2 puts the operator terminal 201, the display device 21d, and the camera 21c on himself. The operator terminal 201 includes a CPU 211, a memory 212, a Real Time Clock (RTC) 213, an Inertial Measurement Unit (IMU) 215, a short distance radio communicating part 216, and a network communication part 217.

The CPU 211 corresponds to a processor that controls the operator terminal 201 in accordance with a program stored in the memory 212. A Random Access Memory (RAM), a Read Only Memory (ROM), and the like are used as the memory 212. The memory 212 stores or temporarily stores the program executed by the CPU 211, data used in a process of the CPU 211, data acquired in the process of the CPU 211, and the like. The program stored in the memory 212 is executed by the CPU 211 and various processes are realized.

The RTC 213 is a device that measures a current time. The IMU 215 includes an inertial sensor, and also, corresponds to a device that includes an acceleration measuring function and a gyro function. The IMU 215 outputs information pertinent to movement of the operator 2.

The short distance radio communicating part 216 conducts short distance radio communications with each of the display device 21d and the camera 21c. The short distance communication may be Bluetooth (registered trademark) or the like. The network communication part 217 sends the camera image 2c, to which posture information is attached, to the remote support apparatus 101, and receives instruction information 2f.

The display device 21d includes a short distance radio communication function, and an audio input/output section. The display device 21d may be a wearable-type display device being eye glasses mounted towards the visual line direction on the head. The display device 21d includes a transparent display part. It is preferable for the operator 2 to visually observe a real view in the visual line direction. The display device 21d displays the instruction detail 2g included in the instruction information 2f received from the operator terminal 201 by the short distance wireless communication.

The camera 21c includes the short distance wireless communication function. The camera 21c is mounted on the head of the operator 2, captures a video in the visual line direction of the operator 2, and sends the camera images 2c to the operator terminal 201 by the short distance wireless communication. The camera 21c may be integrated with the display device 21d as one device.

FIG. 3A and FIG. 3B are diagrams for explaining an example of a case in which the target exists outside the visual field of the operator. In FIG. 3A, when a target 8a to be operated exists outside a visual field 7b of the operator 2, the instructor 1 conveys the three guidance elements to guide toward the target 8a.

When the three guidance elements are conveyed to the operator 2, the target 8a appears in the visual field 7b of the operator 2 as illustrated in FIG. 3B.

The inventors focus on characteristics (reflection of an eye movement) of a human unconsciously trailing a moving object and a reflex action of the human unconsciously (instinctively) reacting to the moving object for avoidance of danger. An example of a guidance icon 9 representing the three guidance elements will be described.

In the following, a guidance destination, such as a place to which the instructor 1 attempts to guide the operator 2, or the target 8t to which the instructor 1 attempts to guide the operator 2, is called "a guidance target 8t (FIG. 4A and FIG. 4B)".

FIG. 4A and FIG. 4B are diagrams for explaining an example of the guidance icon representing the three guidance elements. A case, in which the guidance target 8t is located at a distance more than or equal to a predetermined distance in a lower right direction with respect to the visual field 7b of the operator 2, will be described.

In FIG. 4A, the guidance icon 9 is displayed in a direction where the guidance target 8t exists, in the visual field 7b. Also, the guidance icon 9 moves on a movement locus 7q at a movement speed. The movement locus 7q and the movement speed are defined depending on the distance to the guidance target 8t. When the guidance target 8t exists at the distance more than or equal to a predetermined distance (FIG. 4A), the guidance target 8t moves with a greater and faster vibration or draws the movement locus 7q with a greater and faster movement. The closer the operator 2 approaches the guidance target 8t, the smaller and lower vibration the guidance icon 9 draws the movement locus 7q (FIG. 4B).

By changing the movement of the guidance icon 9, it is possible for the operator 2 to simultaneously recognize that the operator 2 approaches the guidance target 8t closer and closer, that is, the progress level of the guidance.

By the movement and the change of the movement of the guidance icon 9, it is possible for the operator 2 to promptly determine three kinds of information of the progress level: the direction, the distance, and the guidance, by the reflection of an eye movement and the reflex action of the human. That is, it is possible for the guidance icon 9 to induce the operator 2 to unconsciously move the head.

FIG. 5 is a diagram for explaining a difference between information transmissions. In FIG. 5, in a case of guidance information for guiding to the guidance target 8t by using the numerical value, the arrow, and the like, information is transmitted from a sense organ (visual sense) to a cerebrum, and transmitted to a muscle to move the head in accordance with a neural pathway 5a depicted by a dashed line.

On the other hand, the human possesses the characteristics (reflection of an eye movement) unconsciously trailing a moving object. By using the guidance icon 9 with movement such as vibration, it is possible to naturally guide the movement of the head.

In a case of the guidance icon 9, the reflex action may transmit a movement instruction to the muscle via a neural pathway 5b, without passing though the cerebrum. Hence, compared with a case of representing the distance or the like by letter information, a reaction time may be shorter.

Since the cognitive load is reduced, the cerebrum may be used for other operations. Accordingly, it is possible to perform other works in parallel with a head movement along the guidance. Effectiveness of performing various operations may be improved as a whole.

When the guidance icon 9 and multiple contents 3 are displayed at the display device 21d, the guidance icon 9 and the contents 3 are mixed. In this case, it becomes difficult to distinguish the contents 3. In the embodiments, different information types such as the guidance icon 9 and the contents 3 are distinguishably displayed with a visual effect.

Figure 6A:
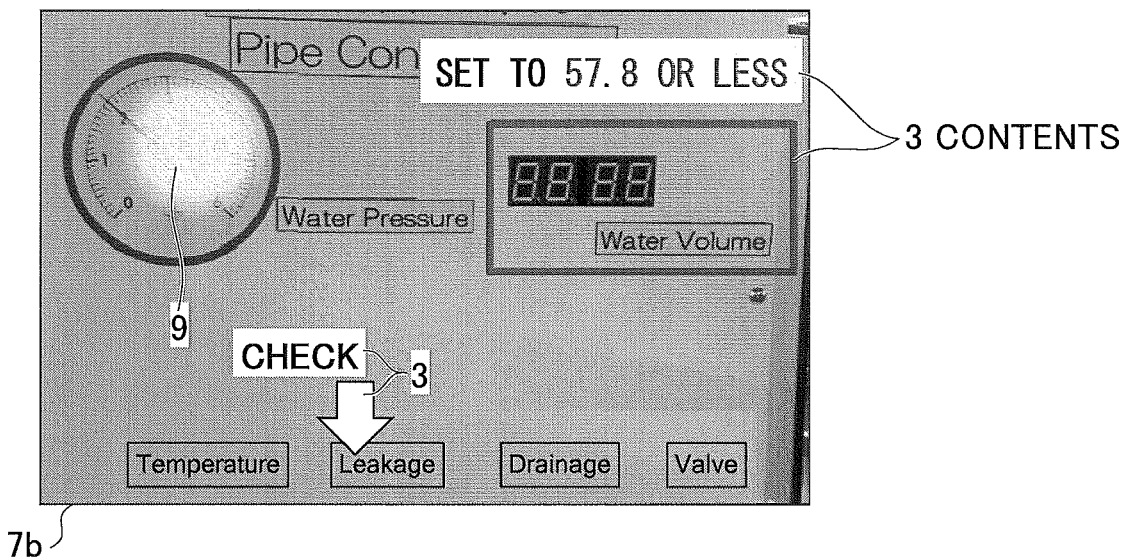
FIG. 6A and FIG. 6B are diagrams illustrating examples of a visual effect making different information types easily distinguishable.
Figure 6B:
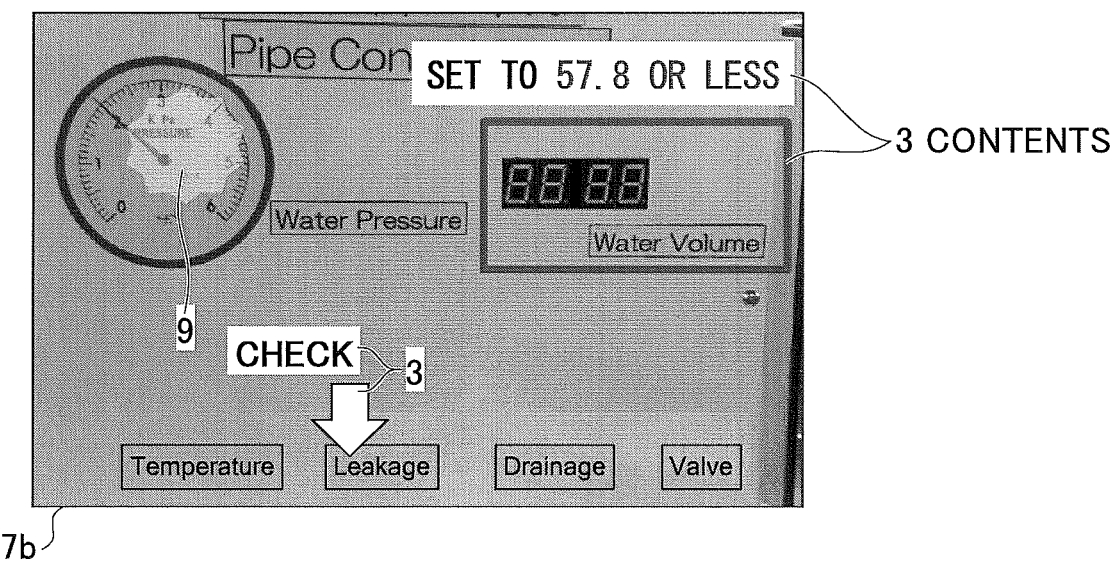

FIG. 6A and FIG. 6B are diagrams illustrating examples of the visual effect making the different information types easily distinguishable. FIG. 6A illustrates an example of displaying one guidance icon 9 and the multiple contents 3 at the display device 21c.

In the visual field 7b, the multiple contents 3 is displayed with a high-definition. Each of the contents 3 is depicted with a sharp outline and without a transparent effect. On the other hand, the guidance icon 9 is vaguely displayed with a lower definition than the contents 3.

As described above, the features of the visual effect such as the definition and the transparency are properly used.

Hence, it is possible for the operator 2 to intuitively distinguish the guidance icon 9 and the multiple contents 3.

In FIG. 6B, similar to FIG. 6A, an example of displaying one guidance icon 9 and the multiple contents 3 at the display device 21d. In this example, in the visual field 7b, regarding the visual effect of the guidance icon 9, the transparency is higher than the multiple contents 3 to vaguely display the guidance icon 9.

As described above, an emphasis degree of the visual effect for the multiple contents 3 is reversed for the guidance icon 9. Alternatively, for the guidance icon 9, an unapplied visual effect for the contents 3 is used. Accordingly, it is possible for the operator 2 to distinguish the guidance icon 9 and the multiple contents 3.

In a case of displaying multiple guidance icons 9 at the display device 21d (the multiple contents 3 may be displayed in some cases), if the multiple guidance icons 9 are mixed, it may be difficult to determine a priority of the operations. In the embodiments, it is possible to easily determine the priority due to the visual effect.

Figure 7B:
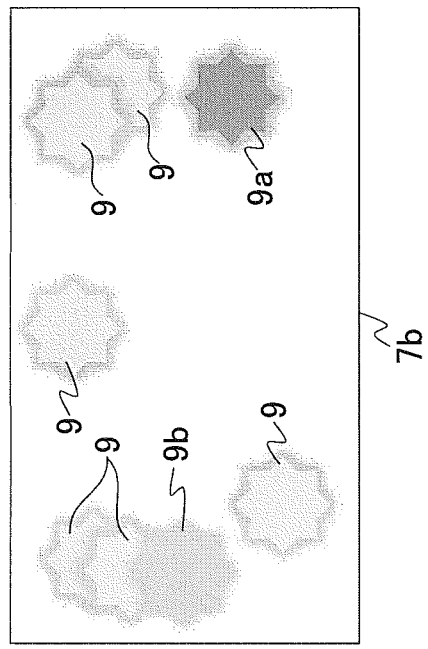
FIG. 7A and FIG. 7B are diagrams illustrating examples of features of the visual effect for easily determining the priority.
Figure 7A:
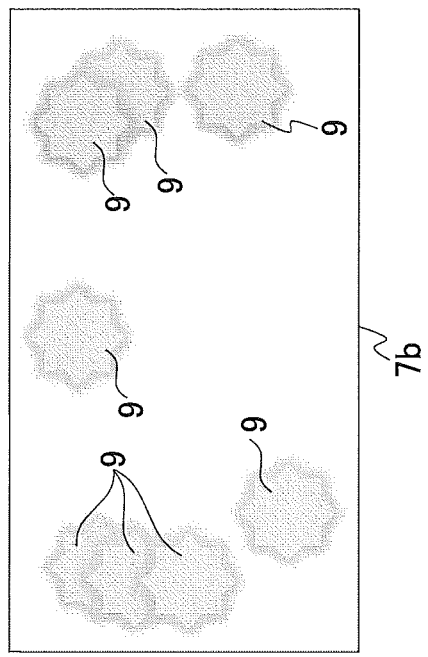

FIG. 7A and FIG. 7B are diagrams illustrating examples of features of the visual effect for easily determining the priority. FIG. 7A depicts an example of displaying eight guidance icons 9 with all the same feature of the visual effect. In this display example, the eight guidance icons 9 are sprinkled at right, an upper, and left. It is difficult for the operator 2 to determine which guidance icon 9 to follow with the priority.

In FIG. 7B, in the eight guidance icons 9, different features of the visual effect are applied to two guidance icons 9a and 9b, respectively, to indicate the two guidance icons 9a and 9b with high priority. In this example, a hue difference is greater between the two guidance icons 9a and 9b with high priority and other guidance icons 9. The more red the hue is, the higher the priority is. The guidance icon 9a of the most red indicates a first ranking of the priority, and the guidance icon 9b of the orange indicates a second ranking of the priority. The guidance icons 9 other than the guidance icons 9a and 9b are presented with light yellow. There is no difference among the features of the visual effect in all guidance icons 9. Hence, it is indicated there is no priority among the other guidance icons 9.

As feature examples of the visual effect for representing a higher priority, a brighter color, a sharpener outline, a higher opacity, and the like may be applied. By utilizing eye attractivity to attract attention of the operator 2, it is possible for the operator 2 to promptly comprehend the priority.

Relationships between the features of the visual effect and the eye attractivity are as follows:
  color: the higher brightness and color saturation, the higher the eye attractivity is.
  size: the greater, the higher the eye attractivity is.
  outline: the sharpener, the higher eye attractivity is.
  blinking: the faster, the higher eye attractivity is (if faster too much, the blinking may not be recognized).

Regarding color and the outline, FIG. 8A and FIG. 8B are diagrams illustrating examples of making the eye attractivity higher due to other features of the visual effect. FIG. 8A is a diagram illustrating an example of making the eye attractivity higher by color. The multiple guidance icons 9 are displayed in the visual field 7b at the display device 21d. In the multiple guidance icons 9, the guidance icons 9 are attractive in a darker color order. The guidance icon 9 of the darkest color is the most attractive.

In FIG. 8B, an example of making the eye attractivity higher by the outline. The multiple guidance icons 9 are displayed in the visual field 7b at the display device 21d. In the multiple guidance icons 9, the guidance icons 9 are easily recognized in a sharpener order of the outline.

FIG. 9 is a diagram illustrating an example in a case of distinguishing the priority due to the hue. In a color wheel 300 changing from red to yellow, green, blue, purple, and to red depicted in FIG. 9, in a case of using a part of the color wheel 300 changing from red to green, a red position may represent the first ranking, an orange position may represent the second ranking, and a yellow position may represent others.

In the following, the remote operation support system 1000 realizing the following embodiments will be described. First, a functional configuration will be described.

Figure 10:
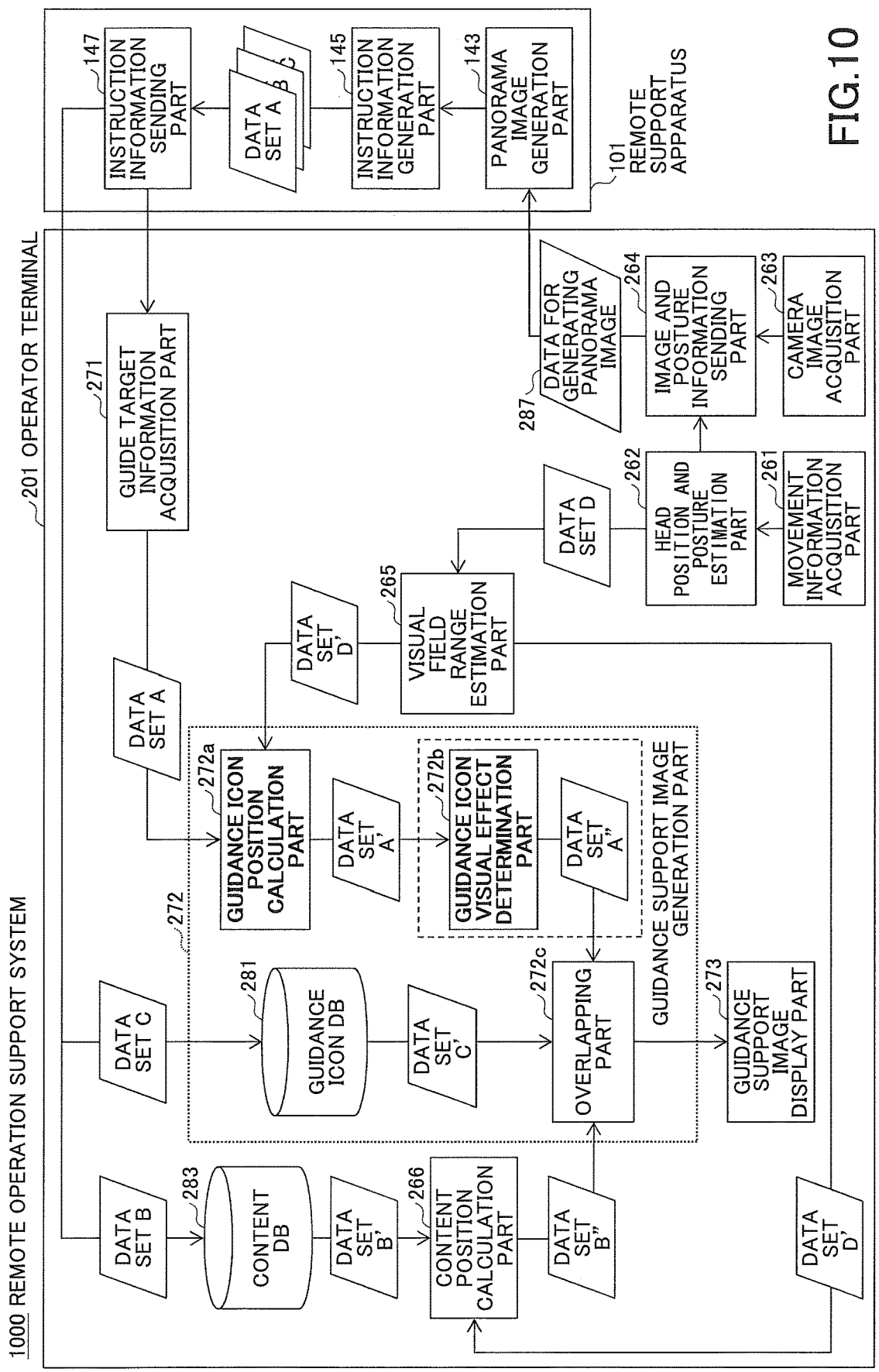
FIG. 10 is a diagram illustrating a functional configuration example of a remote operation support system.

FIG. 10 is a diagram illustrating a functional configuration example of the remote operation support system. In FIG. 10, the remote support apparatus 101 includes a panorama image generation part 143, an instruction information generation part 145, and an instruction information sending part 147. The memory 112 or the HDD 113 stores data sets A, B, C, and the like, which will be described later.

The panorama image generation part 143 links multiple camera images 2c every time of receiving data 287 for generating the panorama image 4 from the operator terminal 201. The generated panorama image 4 is displayed at the display device 115. In the panorama image 4, an area of the visual field 7b is timely updated every time of receiving the camera image 2c.

The instruction information generation part 145 generates the data sets A, B, C, or the like pertinent to a guidance support based on an operation and input of the instruction detail 2g on the panorama image 4, input of voice, and the like by the instructor 1. The instructor 1 may input multiple instructions.

The instruction information sending part 147 sends the instruction information 2f including the data sets A, B, C, or the like generated by the instruction information generation part 145 to the operator terminal 201.

The data set A corresponds to a table, which indicates a position of the instruction to overlap on the current camera image 2c, the priority of the operations, and the like for each of instructions.

The data set B corresponds to a table, which indicates the position to display the instruction, a content detail, and the likes for each of the instructions. In a case of changing to a new instruction detail 2g, the content detail is set. When the content detail is the same as a previous instruction detail 2g, the content detail is not set. In this case, a blank may be set, or information indicating no change may be set.

The data set C corresponds to a table, which stores icon data for each of the instructions. When the icon data are replaced with new icon data, the new icon data are set. However, when the icon data are the same as the previous instruction, no data are set. In this case, the blank may be set, or the information indicating no change may be set.

The operator terminal 201 includes a movement information acquisition part 261, a head position and posture estimation part 262, a camera image acquisition part 263, an image and posture information sending part 264, a visual field range estimation part 265, a content position calculation part 266, a guide target information acquisition part 271, a guidance support image generation part 272, and a guidance support image display part 273. The memory 212 stores the data sets A, B, C, and D, the data 287 for generating the panorama image 4, a guidance icon DB 281, a content DB 283, and the like.

The movement information acquisition part 261 acquires and provides movement information from the IMU 215 to the head position and posture estimation part 262. The head position and posture estimation part 262 estimates a head position and a posture of the operator 2 based on the movement information. The data set D including information indicating the estimated head position and posture are stored in the memory 212. The information indicating the estimated head position and posture is also provided to the image and posture information sending part 264.

The camera image acquisition part 263 acquires the camera image 2*c* captured by the camera 21*c*, from the camera 21*c* through the short distance radio communicating part 216, and provides the acquired camera image 2*c* to the image and posture information sending part 264. The image and posture information sending part 264 generates the data 287 for generating the panorama image 4, which include information of the head position and posture estimated by the head position and posture estimation part 262 and the camera image 2*c* received from the camera image acquisition part 263, and sends the data 287 to the remote support apparatus 101 via the network communication part 217.

The visual field range estimation part 265 estimates a current visual field range based on the data set D. The data set D', to which estimated current visual field range information indicating the estimated current visual field range is added, are output to the memory 212. The data set D' is referred to by the content position calculation part 266 and the guidance support image generation part 272.

The content position calculation part 266 acquires a latest data set B' from the content DB 283, and calculates a drawing position for each of the contents 3 maintained in the latest data set B' based on the visual field range of the data set D'. The data set B' corresponds to a table, in which existing content detail being stored in the content DB 283 are set with respect to the data set B received from the remote support apparatus 101 when the content detail is not changed. The calculated drawing position is added to the latest data set B', and the data set B" including the drawing position is generated in the memory 212.

The guide target information acquisition part 271 receives the data set A from the instruction information sending part 147 of the remote support apparatus 101, and reports the received data set A to the guidance support image generation part 272. The guidance target corresponds to the guidance destination such as a place where the instructor 1 desires to guide the operator 2, the guidance target 8*t* where the operator 2 desires the operator 2 to work, or the like. Guidance target information includes at least the position information for the place as the guidance destination for the operator 2, the guidance target 8*t*, and the like.

The guidance support image generation part 272 synthesizes the guidance icon with the contents 3 at the drawing position, and generates a guidance support image. The guidance support image generation part 272 further includes a guidance icon position calculation part 272*a*, a guidance icon visual effect determination part 272*b*, and an overlapping part 272*c*. The guidance icon DB 281 is accessed by the guidance support image generation part 272.

The guidance icon position calculation part 272*a* calculates the drawing position of the guidance icon, and the distance to the target for each of the instructions in the data set A, based on the current visual field range in the data set D'. In the data set A, for each of the instructions, data set A' replaces the calculated drawing position of the guidance icon and the distance to the target of the data set A in the memory 212.

The guidance icon visual effect determination part 272*b* determines parameters of the visual effect of the guidance icon (icon visual effect parameters) for each of the instruction in the data set A', and replaces the data set A' in the memory 212 with data set A" to which the determined parameters are added.

The overlapping part 272*c* refers to the data set A", the data set B", and the data set C', arranges the drawing position of the guidance icon by applying the visual effect to the guidance icon, deploys the content 3 at a content drawing position, and overlaps the guidance icon with the content 3, so as to generate the guidance support image. The overlapping part 272*c* synthesizes the guidance icon with the content 3 for each of the instruction by using an instruction ID.

The guidance support image display part 273 displays the guidance support image, in which the guidance icon and the content 3 are overlapped with each other, at the display device 21*d*.

Next, various data sets used in the embodiments are described. FIG. 11 is a diagram illustrating a data structure example of the data set A. In FIG. 11, the data set A is regarded as the table for managing information pertinent to the visual effect of the guidance icon 9 for each of the instructions in the operator terminal 201. A table transition of the data set A is depicted by the data sets A' and A".

The data set A has a data structure at an initial time when the data set A is received from the instruction information sending part 147 of the remote support apparatus 101, and includes items of the instruction ID, a content position, the priority, and the like.

The instruction ID is regarded as an identification, which the instruction information generation part 145 of the remote support apparatus 101 applies to each of the instructions made by the instructor 1. The content position indicates a position where an instruction content is displayed, and is indicated by a relative position from a reference point defined in the visual field 7*b*. The priority indicates an instruction priority. When no priority is defined for the instructions, a same numerical value may be set for all the instructions.

The data set A' corresponds to a table, in which items of a guidance icon drawing position and the distance to the target are added to the data set A. The guidance icon drawing position and the distance to the target indicate values calculated by the guidance icon position calculation part 272*a* of the operator terminal 201. The drawing position of the guidance icon indicates the drawing position of the guidance icon 9 in the visual field 7*b*. The distance to the target indicates a movement distance of a visual line from a center of the visual field 7*b* (hereinafter, simply called "visual field center") to the guidance target 8*t*.

The data set A" corresponds to a table, in which an item of icon visual effect parameters is added to the data set A' by the guidance icon visual effect determination part 272*b* of the operator terminal 201. The item of icon visual effect parameters indicates one or more parameter values determined by the guidance icon visual effect determination part 272*b* in order to make the guidance icon 9 and the contents 3 easily distinguishable and to improve the eye attractivity.

FIG. 12 is a diagram illustrating a data structure example of the data set B. In FIG. 12, the data set B corresponds to a table, which maintains display information of the contents 3 for each of the instructions at the operator terminal 201. The table transition of the data set B is indicated by the data sets B' and B".

The data set B has a data structure at the initial time when the data set A is received from the instruction information sending part 147 of the remote support apparatus 101, and includes items of the instruction ID, the content position, content detail, and the like.

The instruction ID indicates an identification, which the instruction information generation part 145 of the remote support apparatus 101 applies to each of the instructions made by the instructor 1 and indicates one of the instruction IDs listed in the data set A. The content position indicates a position to display the instruction detail, and is indicated by the relative position from the reference point defined in the visual field 7b. The content detail represents the instruction detail to display. When the content detail is blank, or indicates a specific value representing no change, this means that the instruction detail specified by the instruction ID has not changed.

The data set B' may be the table, in which the content detail is set to the data set B by acquiring from the content DB 283 with respect to the instruction in which the content detail is not changed. In this example in FIG. 12, since the content detail of the instruction ID "T2" is not changed, the content detail "Content-T2" of the instruction ID "T2" is set from the content DB 283.

The data set B" may be a table, in which the item of the content drawing position is added to the data set B'. The content drawing position indicates a value calculated by the guidance icon position calculation part 272a of the operator terminal 201, and indicates the drawing position of the contents 3 in the visual field 7b.

Figure 13:
FIG. 13 is a diagram illustrating a data structure example of data set C.

FIG. 13 is a diagram illustrating a data structure example of the data set C. In FIG. 13, the data set C may be a table for maintaining data of the guidance icon 9 for each of the instructions at the operator terminal 201. The table transition of the data set C is indicated by the data set C'.

The data set C has a data structure at the initial time when the data set A is received from the instruction information sending part 147 of the remote support apparatus 101, and includes items of the instruction ID, the guidance icon data, and the like.

The instruction ID indicates an identification, which the instruction information generation part 145 of the remote support apparatus 101 applies to each of the instructions made by the instructor 1 and indicates one of the instruction IDs listed in the data set A. The guidance icon data indicates data of the guidance icon 9. When the content detail is blank, or indicates the specific value representing no change, this means that the guidance icon data specified by the instruction ID has not changed.

The data set C' may be the table, in which the guidance data corresponding to the instruction ID is acquired and set from the guidance icon DB 281 for an instruction in which the guidance icon data has not changed, with respect to the data set C. In this example, since the guidance icon data of the instruction ID "T1" has not changed, the guidance icon data "Icon-T1" of the instruction ID "T1" are set from the guidance icon DB 281.

Figure 14:
FIG. 14 is a diagram illustrating a data structure example of data set D.

FIG. 14 is a diagram illustrating a data structure example of the data set D. In FIG. 14, the data set D is generated by the head position and posture estimation part 262 of the operator terminal 201, and indicates current head position and posture information when being generated.

The data set D' is generated by adding the current visual field range information indicating a range of the visual field 7b, which is estimated by the visual field range estimation part 265, to the data set D.

Next, a guidance support image generation process conducted by the guidance support image generation part 272 will be described.

First Embodiment

In a case of representing the distance and the progress level in the three guidance element, the guidance support image generation part 272 may suppress a guidance icon visual effect determination process of the guidance icon visual effect determination part 272b. This case will be described as the guidance support image generation process in the first embodiment.

Figure 15:
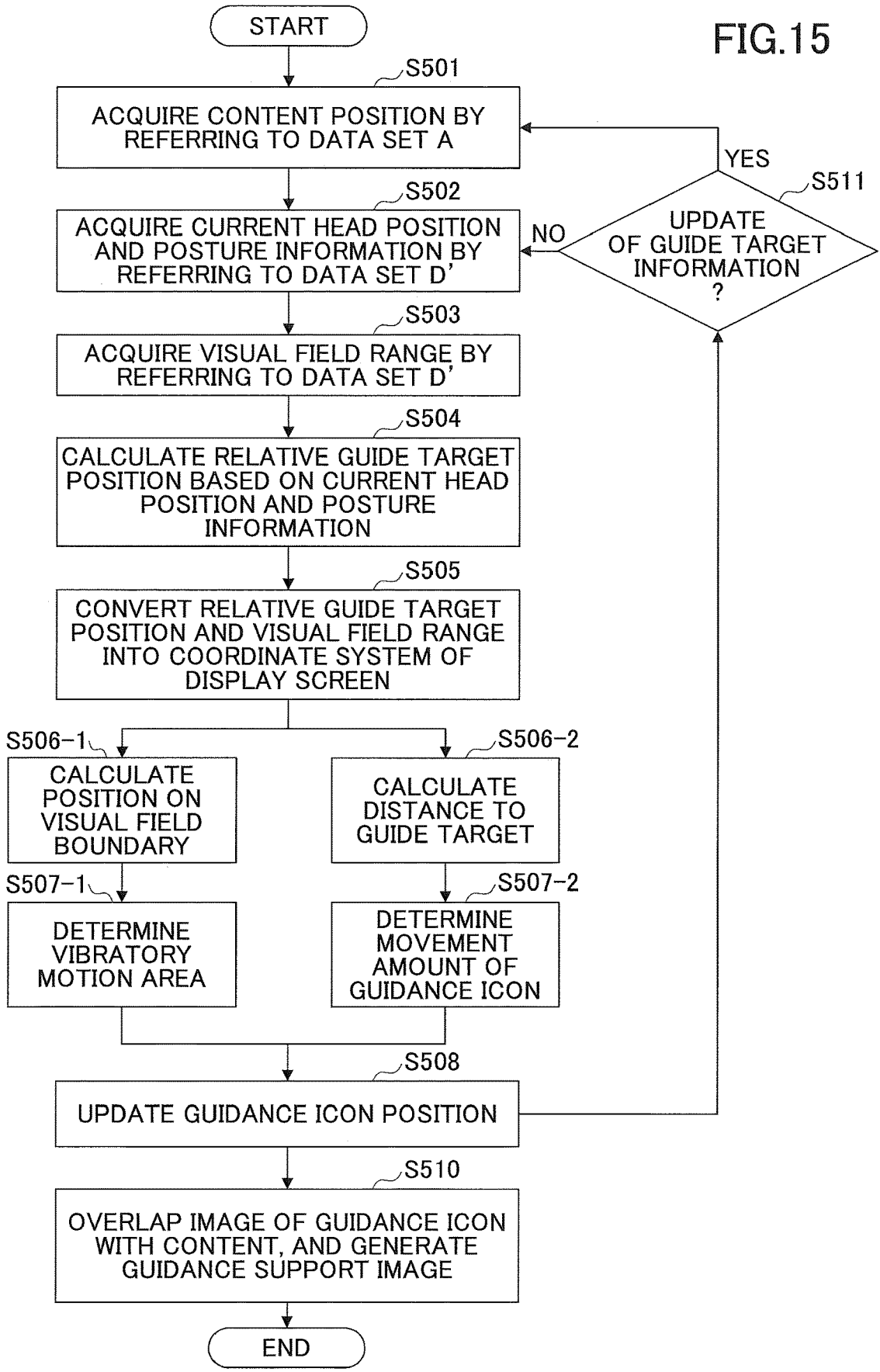
FIG. 15 is a flowchart for explaining a guidance support image generation process in a first embodiment.

FIG. 15 is a flowchart for explaining the guidance support image generation process in the first embodiment. In the guidance support image generation part 272, the guidance icon position calculation part 272a refers to the data set A, and acquires the content position (step S501).

Also, the guidance icon position calculation part 272a acquires the current head position and posture information by referring to the data set D' (step S502), and further acquires the visual field range (step S503).

The guidance icon position calculation part 272a calculates the relative position (hereinafter, simply called "relative guidance target positon") of the guidance target based on the current head position and posture information (step S504). The relative guidance target position may indicate a target position, which is the guidance destination of the operator 2 or the visual line of the operator 2 by the instructor 1, a position of the guidance target 8t, which the instructor 1 desires the operator 2 to operate, or the like.

The guidance icon position calculation part 272a converts the relative guidance target position and the visual field range into the coordinate system of a display screen of the display device 21d (step S505).

The guidance icon position calculation part 272a calculates a position on a boundary of the visual field 7b depending on the relative guidance target position (step S506-1), and determines a vibratory motion area 6r (step S507-1). Also, the guidance icon position calculation part 272a calculates a distance L (described later) to the guidance target 8t by using the relative guidance target position (step S506-2), and determines a movement amount of the guidance icon 9 (step S507-2).

Processes in the steps S506-1 and S507-1 may be conducted later than processes in steps S506-2 and S507-2.

The guidance icon position calculation part 272a updates the position of the guidance icon 9 based on the vibratory motion area 6r (FIG. 17) and the movement amount (step S508). In response to an update of the position of the guidance icon 9, the overlapping part 272c overlaps an image of the guidance icon 9 and a detail of the content 3 with each other, and generates the guidance support image (step S510).

On the other hand, every time of updating the position of the guidance icon 9, the guidance icon position calculation part 272a determines whether the guidance target information is updated (step S511). The guidance icon position calculation part 272a may determine whether a new data set A is received.

When the guidance target information is updated (YES of step S511), the guidance icon position calculation part 272a goes back to step S501, acquires the content position by referring to the new data set A, and repeats the above described processes in the same manner.

On the other hand, when the guidance target information is not updated (NO of step S511), the guidance icon position calculation part 272a goes back to step S502, acquires the current head position and posture information by referring to the data set D', and repeats the above described processes in the same manner.

Figure 16:
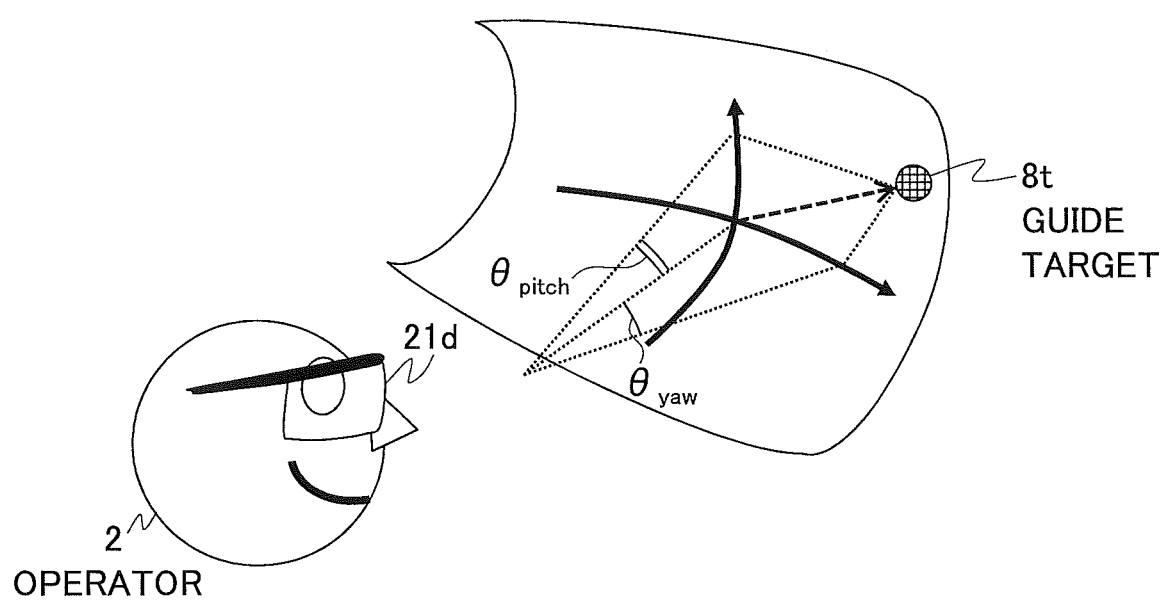
FIG. 16 is a diagram for explaining the relative guidance target position in a first embodiment.

FIG. 16 is a diagram for explaining the relative guidance target position in the first embodiment. In a case in which the head position of the operator 2 is approximately fixed, a head posture is presented by two rotation angles (yaw and pitch). The guidance target 8t is fixed in a real environment. However, the relative position of the guidance target 8t is changed in association with the change of the head posture.

Figure 17:
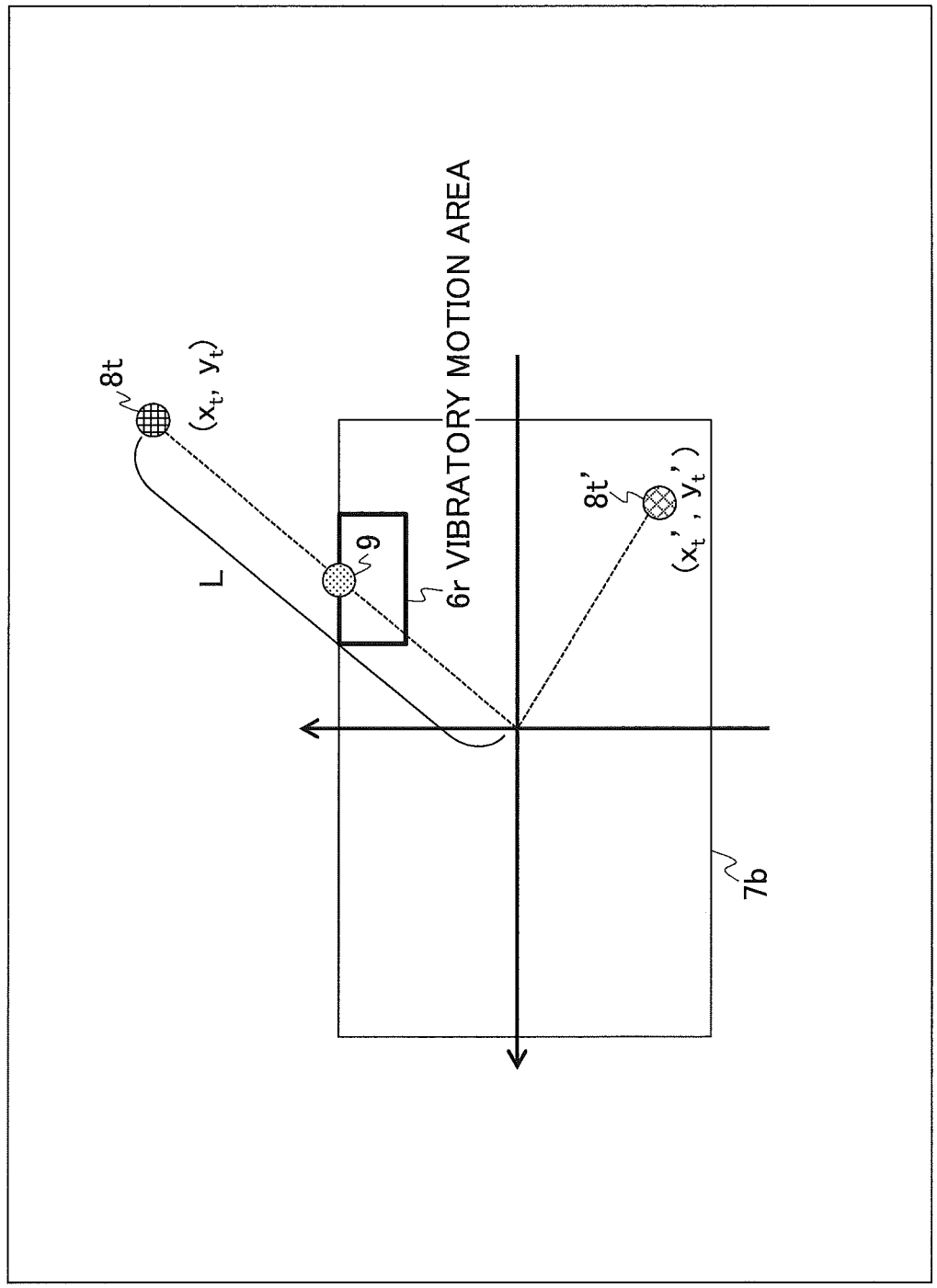
FIG. 17 is a diagram for explaining a position relationship to a guidance target in the first embodiment.

FIG. 17 is a diagram for explaining a position relationship to the guidance target in the first embodiment. FIG. 17 depicts the position relationship between the guidance target 8t and an intersection point on a visual field boundary in a case in which the guidance target 8t exists outside the visual field 7b.

When $(x_t, y_t)$ indicates the relative guidance target position converted in step S505 in FIG. 15, the distance L from the visual field center to the guidance target 8t is expressed by $$L = \sqrt{x_t^2 + y_t^2}.$$ [formula 1]

A line through the relative guidance target position and the visual field center of the operator 2 is expressed by $$y = \frac{y_t}{x_t} x.$$ [formula 2]

When the guidance target 8t is outside the visual field 7b, for intersection coordinates $(x_{edge}, y_{edge})$ at an upper side on the visual field boundary, the following expression is substituted to y of the formula 1:

$$y_{edge} = \text{vertical} VA/2,$$

and the following formula 3 is acquired:

$$x_{edge} = \text{vertical} VA \frac{x_t}{2y_t}.$$ [Formula 3]

In the same manner, for intersection coordinates $(x_{edge}, y_{edge})$ at a lower side on the visual field boundary, the following expression is substituted to y of the formula 1:

$$y_{edge} = -\text{vertical} VA/2,$$

and the following formula 4 is acquired:

$$x_{edge} = -\text{vertical} VA \frac{x_t}{2y_t}.$$ [Formula 4]

For intersection coordinates $(x_{edge}, y_{edge})$ at a left side on the visual field boundary, the following expression is substituted to x of the formula 1:

$$x_{edge} = \text{holizontal} VA/2,$$

and the following formula 5 is acquired:

$$y_{edge} = \text{horizontal} VA \frac{y_t}{2x_t}.$$ [Formula 5]

For intersection coordinates $(x_{edge}, y_{edge})$ at a right side on the visual field boundary, the following expression is substituted to x of the formula 1:

$$x_{edge} = -\text{holizontal} VA/2,$$

and the following formula 6 is acquired:

$$y_{edge} = -\text{horizontal} VA \frac{y_t}{2x_t}.$$ [Formula 6]

Also, verticalVA indicates a vertical visual field range (field angle), and horizontalVA indicates a horizontal visual field (field angle). Also, in a case of the guidance target 8t' in the visual field 7b, the relative guidance target $(x_t, x_{y'})$ of the guidance target 8t' is set as the position of the guidance icon 9'.

FIG. 18A through FIG. 18C are diagrams for explaining a behavior example of the guidance icon in the first embodiment. In FIG. 18A through FIG. 18C, a behavior of the guidance icon 8t depending on the movement of the head of the operator 2 at the work site is exemplified. In FIG. 18 through FIG. 18C, $\theta_{yaw}$ indicates an angle changing in a horizontal direction of a head posture, and $\theta_{pitch}$ indicates an angle changing in a vertical direction.

FIG. 18A depicts a state in which the operator 2 at the work site faces to front, and an image of the visual field 7b of the operator 2 in that state. When the instructor 1 clicks the guidance target 8t at an upper right outside the visual field 7b on the panorama image 4 displayed at the remote support apparatus 101, the guidance icon 9 is displayed at the display device 21d of the operator 2. The guidance icon 9 draws the movement locus 7q and moves relatively faster in the visual field 7b of the operator 2.

The operator 2 rotates the head to a right direction in order to turn his/her eyes to the moving guidance icon 9 (FIG. 18B). In accordance with the movement of the head, the guidance icon 9 displayed at the display device 21d of the operator 2 moves to an approximately upper center of the visual field 7b. The guidance icon 9 draws the movement locus 7q while moving slower than the movement depicted in FIG. 18A.

Further, when the operator 2 follows the guidance icon 9 with his/her eyes and rotates the head obliquely upward to a right (FIG. 18C), the guidance icon 9, which is being displayed depending on the head movement at the display device 21d of the operator 2, moves to the upper right of the visual field 7b, and draws the movement locus 7q while moving much slower than the movement depicted in FIG. 18B.

In FIG. 18A, FIG. 18B, and FIG. 18C, the guidance icon 9 represents a direction for the visual line to move. Also, the shorter the movement distance L of the visual line from the visual field center to the guidance target 8t is, the smaller the movement amount of the guidance icon 9 becomes. That is, a length of the movement locus 7q becomes shorter, and the movement speed becomes slower. Furthermore, this change from a greater movement amount to a smaller movement amount represents the progress level for the guidance.

In FIG. 18A and FIG. 18B, the movement locus 7q may indicate an amount of the vibration of the guidance icon 9. The three guidance elements are visually depicted, but not limited to, the vibration represented by the movement, the change, and the like of the guidance icon 9. Also, various examples will be described later.

The guidance icon 9, to which the change or the like is applied, reduces the cognitive load, compared with a case of reading the guidance information such as the numerical value, the arrow, or the like to the guidance target 8t.

In the following, a vibration method of the guidance icon 9 or the visual effect corresponding to the vibration method.

Second Embodiment

The guidance support image generation process in the second embodiment, in which the three guidance elements are represented by the guidance icon 9 moving and being vibrated on a line through the visual field center and the guidance target 8t in the visual field 7d, will be described.

Figure 19:
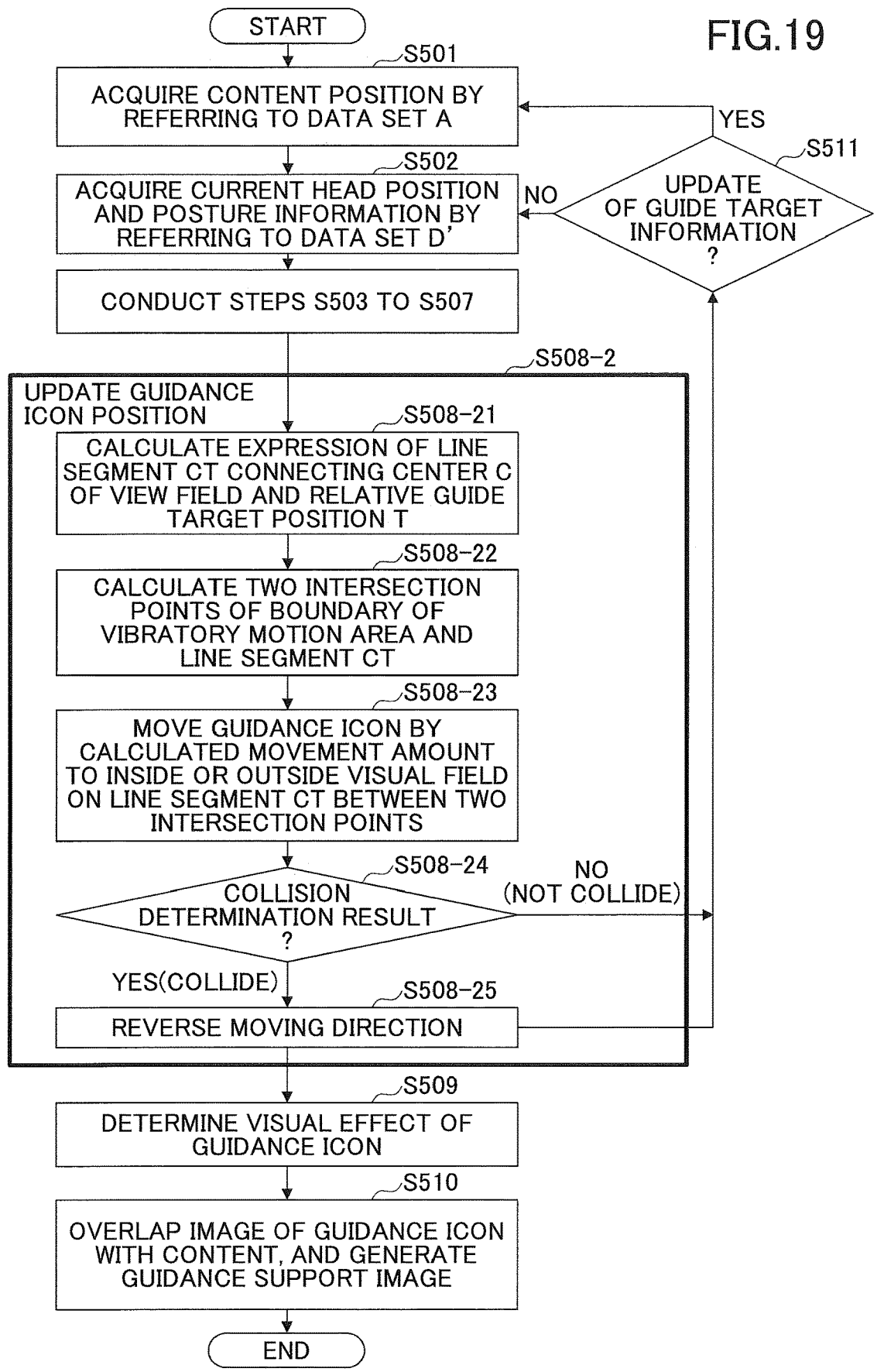
FIG. 19 is a flowchart for explaining the guidance support image generation process in a second embodiment.
Figure 20:
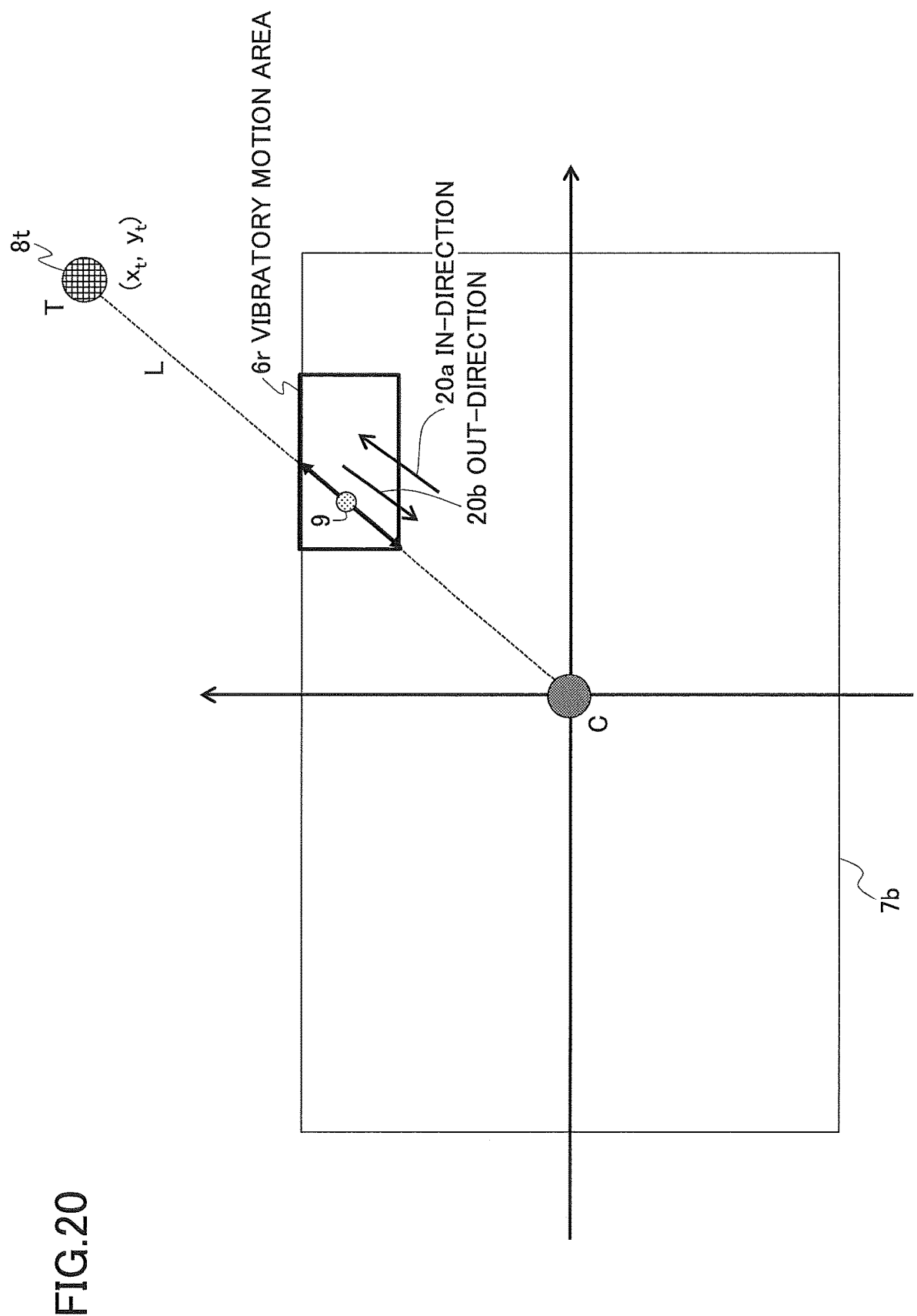
FIG. 20 is a diagram for explaining the vibration method of the guidance icon in the second embodiment.

FIG. 19 is a flowchart for explaining the guidance support image generation process in the second embodiment. The guidance support image generation process in the second embodiment will be described with reference to FIG. 20. FIG. 20 is a diagram for explaining the vibration method of the guidance icon in the second embodiment.

In the guidance support image generation part 272, the guidance icon position calculation part 272a acquires the content position by referring to the data set A (step S501).

Also, the guidance icon position calculation part 272a acquires the current head position and posture information by referring to the data set D' (step S502), and conducts steps S503 through S507 (FIG. 15). After that, the guidance icon position calculation part 272a updates the guidance icon position (step S508-2: a update process of the guidance icon position).

The guidance icon position calculation part 272a calculates an expression of a line segment CT connecting between the visual field center C and the relative guidance target position T (step S508-21). Also, the guidance icon position calculation part 272a calculates two sets of the intersection coordinates defined by a boundary of the vibratory motion area 6r and the line segment CT (step S508-22). The movement amount is calculated based on the two sets of the intersection coordinates.

Next, the guidance icon position calculation part 272a moves the guidance icon 9 by the movement amount in an in-direction 20a or an out-direction 20b (an in/out direction) with respect to the vibratory motion area 6r in the visual field 7b on the line segment CT between the two intersections (step S508-23).

Also, the guidance icon position calculation part 272a conducts a collision determination whether the guidance icon 9 collides in the vibratory motion area 6r (step S508-24). When the guidance icon 9 does not collide with the two intersections (NO of step S508-24), the guidance icon position calculation part 272a determines whether the guidance target information is updated (step S511).

When the guidance target information is updated (YES of step S511), the guidance icon position calculation part 272a goes back to step S501, acquires the content position by referring to the new data set A, and repeats the above described processes in the same manner.

On the other hand, when the guidance target information is not updated (NO of step S511), the guidance icon position calculation part 272a goes back to step S502, acquires the current head position and posture information by referring to the data set D', and repeats the above described processes in the same manner.

On the other hand, When the guidance icon 9 collides with the two intersections (YES of step S508-24), the guidance icon position calculation part 272a reverses the moving direction (step S508-25).

Next, the guidance icon position calculation part 272a determines the visual effect of the guidance icon 9 (step S509). After that, the overlapping part 272c overlaps the image of the guidance icon 9 and the detail of the content 3 with each other, and generates the guidance support image (step S510).

On the other hand, every time of updating of the position of the guidance icon 9, the guidance icon position calculation part 272a determines whether the guidance target information is updated (step S511). The guidance icon position calculation part 272a may determine whether the new data set A is received.

When the guidance target information is updated (YES of step S511), the guidance icon position calculation part 272a goes back to step S501, acquires the content position by referring to the new data set A, and repeats the above described processes in the same manner.

On the other hand, when the guidance target information has not been updated (NO of step S511), the guidance icon position calculation part 272a goes back to step S502, acquires the current head position and posture information by referring to the data set D', and repeats the above described processes in the same manner.

In the second embodiment, the guidance icon 9 vibrates by moving between the calculated two intersections. The movement amount of the guidance icon 9 is changed depending on the distance L between the guidance target 8t and the visual field center. The distance L is changed in association with the head posture. Various settings may be possible such as a proportional or inversely to the distance L, an inversely proportional to a square of the distance L. The movement amount is regarded as the movement speed or a vibration speed.

Third Embodiment

The blinking of the guidance icon 9 may be considered as the visual effect corresponding to the vibration. The guidance support image generation process in the third embodiment will be described. In the guidance support image generation process in the third embodiment, the guidance icon 9 is blinked in a vicinity of the boundary in the visual field 7b. A blinking frequency in the third embodiment corresponds to the movement amount in the second embodiment (the movement speed or the vibration speed).

Figure 21:
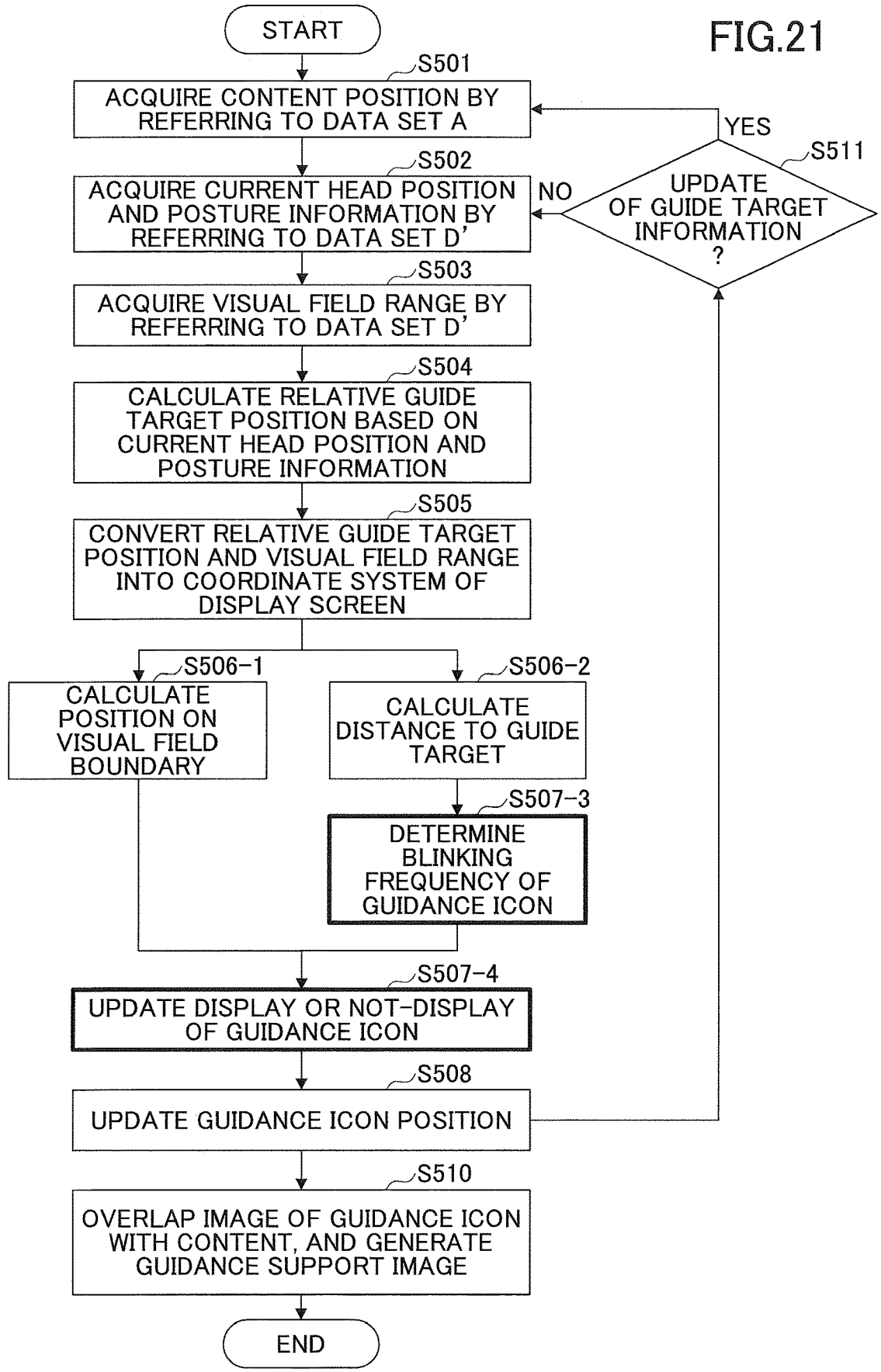
FIG. 21 is a flowchart for explaining the guidance support image generation process in a third embodiment.

FIG. 21 is a flowchart for explaining the guidance support image generation process in the third embodiment. In the guidance support image generation process in the third embodiment, steps different from the guidance support image generation process (FIG. 15) in the first embodiment will be described, and explanations of similar steps will be omitted. In FIG. 21, steps S507-3 and S507-4 are different from those of the guidance support image generation process in the first embodiment. Also, step S507-1 in the first embodiment is omitted.

The guidance icon position calculation part 272a determines the blinking frequency of the guidance icon 9 (step S507-3). The blinking frequency is increased in association with the change of the distance L between the guidance target 8t and the visual field center. After that, the guidance icon position calculation part 272a switches the guidance icon 9 to display or not to display based on the determined blinking frequency (step S507-4).

Fourth Embodiment

The guidance support image generation process in a fourth embodiment will be described. In the fourth embodiment, depending on a collision detection to one or more objects defined in the vibratory motion area 6r, the movement direction of the guidance icon 9 is changed. Other than a process for changing the position of the guidance icon 9, the guidance support image generation process is similar to that in the first embodiment. Thus, the same reference number is applied and the explanation there of will be omitted.

Figure 22:
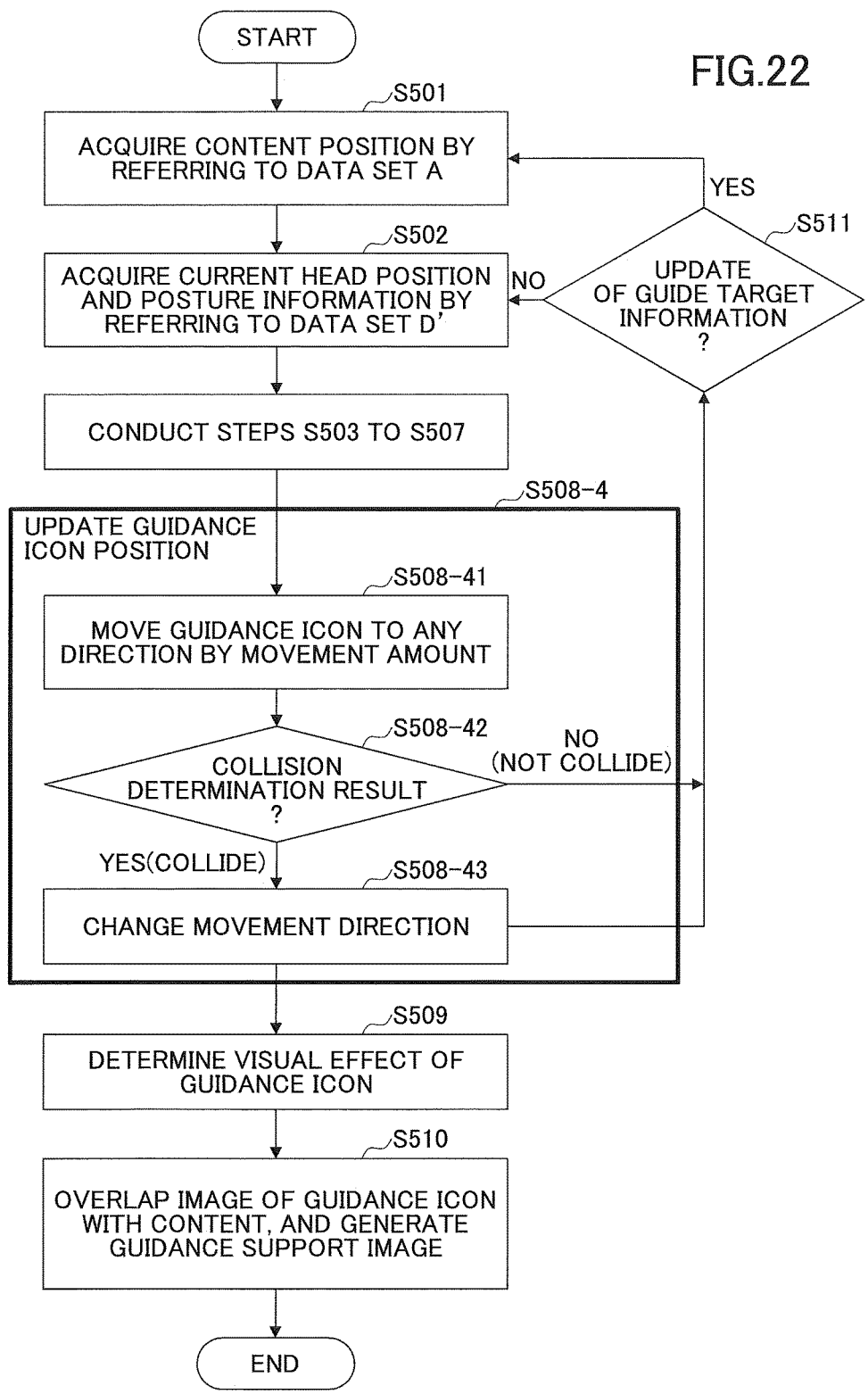
FIG. 22 is a flowchart for explaining the guidance support image generation process in a fourth embodiment.

FIG. 22 is a flowchart for explaining the guidance support image generation process in the fourth embodiment. In the guidance support image generation process in the fourth embodiment, steps different from the guidance support image generation process (FIG. 15) in the first embodiment will be described, and explanations of similar steps will be omitted. In FIG. 22, step S508-4 is different from step S508 in the guidance support image generation process in the first embodiment.

In step S508-4, the guidance icon position calculation part 272a moves the guidance icon 9 to any direction by the movement amount (step S508-41), and conducts the collision determination to the object (step S508-42). When the guidance icon 9 does not collide with the object (NO of step S508-42), the guidance icon position calculation part 272a determines the guidance target information is updated (step S511).

When the guidance target information is updated (YES of step S511), the guidance icon position calculation part 272 as goes back to step S501, acquires the content position by referring to the new data set A, and repeats the above described processes in the same manner.

On the other hand, when the guidance target information is not updated (NO of step S511), the guidance icon position calculation part 272a goes back to step S502, acquires the current head position and posture information by referring to the data set D', and repeats the above described processes in the same manner.

On the other hand, when the guidance icon 9 collides to the object (YES of step S508-42), the guidance icon position calculation part 272a changes the movement direction (step S508-43). The movement direction may be changed by determining respective movement amounts with a random number when the movement amount of the guidance icon 9 is divided into x and y. The process after the change of the movement direction is the same as that in the first embodiment, and the explanation thereof will be omitted.

Figure 23A:
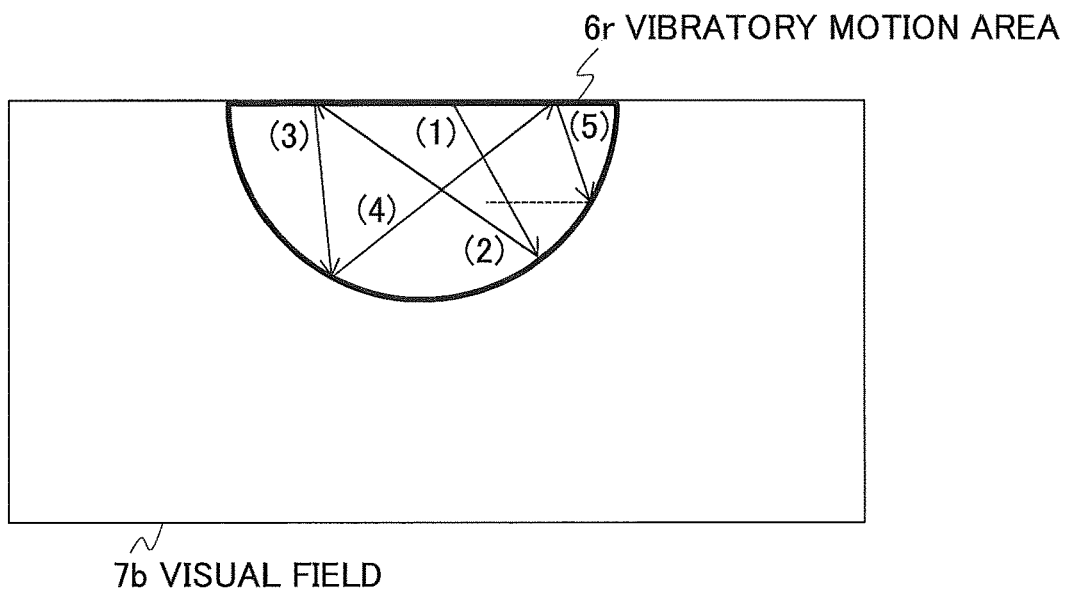
FIG. 23A and FIG. 23B are diagrams for explaining movement change examples in a vibratory motion area in the fourth embodiment.
Figure 23B:
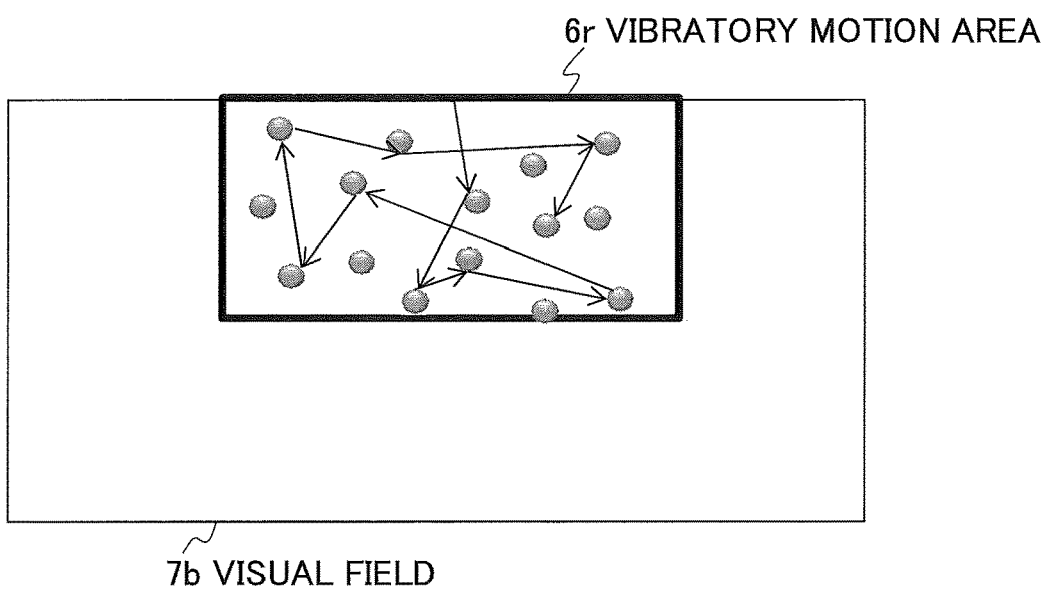

FIG. 23A and FIG. 23B are diagrams for explaining movement change examples in the vibratory motion area in the fourth embodiment. FIG. 23A depicts a movement change example in a case in which a half circle is defined as the vibratory motion area 6r. In this example, the object used to determine a collision is the boundary of the vibratory motion area 6r.

Arrows of (1) to (5) in the boundary of the vibratory motion area 6r represent the movement direction examples of the guidance icon 9. The guidance icon 9 moves in the object, and changes the movement direction when the guidance icon 9 collides a periphery of the object. The object is not limited to the half circle. Any shape of the object may be applied.

In FIG. 23B, the boundary of the vibratory motion area 6r, and medium particles in the vibratory motion area 6r are defined as the object to determine the collision. Brownian motion may be applied for motions of the medium particles.

Fifth Embodiment

The guidance support image generation process in the fifth embodiment will be described. In the fifth embodiment, a reflection coefficient at a boundary of the visual field 7b and a surface other than the boundary is changed when the guidance icon 9 collides in the visual field 7b. In the fifth embodiment, a process for changing the reflection coefficient at the collision of the guidance icon 9 is different from the first embodiment. Since other steps are the same as those in the guidance support image generation process in the first embodiment, steps that are the same as the those in the first embodiment are designated by the same reference numerals, and explanations thereof will be omitted.

Figure 24:
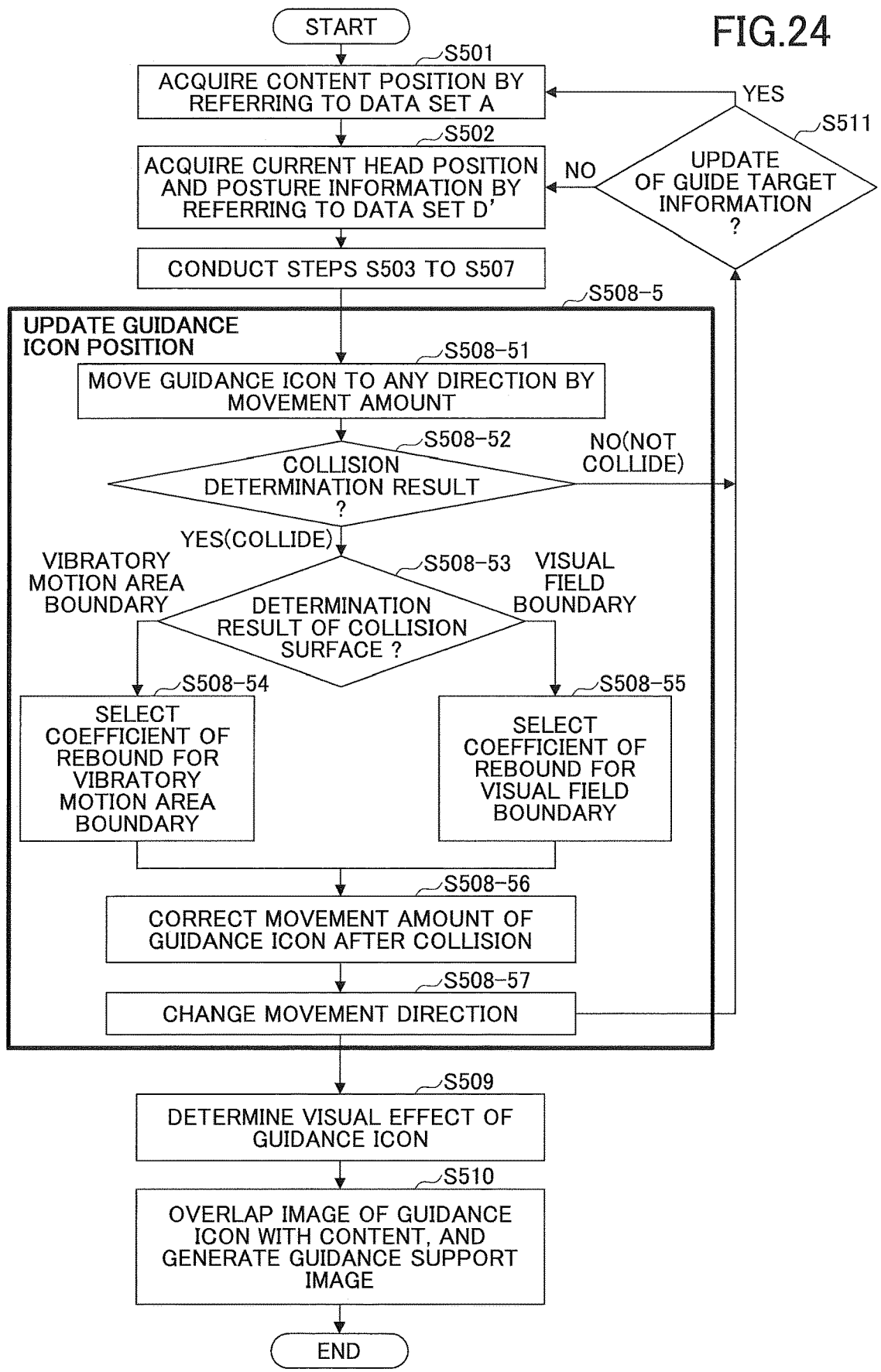
FIG. 24 is a flowchart for explaining the guidance support image generation process in a fifth embodiment.

FIG. 24 is a flowchart for explaining the guidance support image generation process in the fifth embodiment. In the guidance support image generation process in the fifth embodiment, steps different from the guidance support image generation process (FIG. 15) will be described. Steps that are the same as the those in the first embodiment are designated by the same reference numerals, and explanations thereof will be omitted. In FIG. 24, step S508-5 is different from step S508 in the first embodiment.

In step S508-5, the guidance icon position calculation part 272a moves the guidance icon 9 in any direction by the movement amount (step S508-51), and conducts the collision determination with the object (step S508-52). When the guidance icon 9 does not collide with the object (NO of step S508-52), the guidance icon position calculation part 272a determines whether the guidance target information is updated (step S511).

When the guidance target information is updated (YES of step S511), the guidance icon position calculation part 272a goes back to step S501, acquires the content position by referring to the new data set A, and repeats the above described processes in the same manner.

On the other hand, when the guidance target information is not updated (NO of step S511), the guidance icon position calculation part 272a goes back to step S502, acquires the current head position and posture information by referring to the data set D', and repeats the above described processes in the same manner.

On the other hand, when the guidance icon 9 collides with the object (YES of step S508-52), the guidance icon position calculation part 272a determines whether a collision surface is the boundary of the vibratory motion area 6r or the boundary of the visual field 7b (step S508-53).

When the collision surface is the boundary of the vibratory motion area 6r, the guidance icon position calculation part 272a selects the reflection coefficient for the boundary of the vibratory motion area 6r (step S508-54). On the other hand, when the collision surface is the boundary of the visual field 7b, the guidance icon position calculation part 272a selects the reflection coefficient for the boundary of the visual field 7b (step S508-54).

The guidance icon position calculation part 272a corrects the movement amount of the guidance icon after the collision by using the selected reflection coefficient (step S508-56), and changes the movement direction (step S508-57). The processes after the movement direction is changed are the same as those in the first embodiment, and explanations thereof will be omitted.

Figure 25:
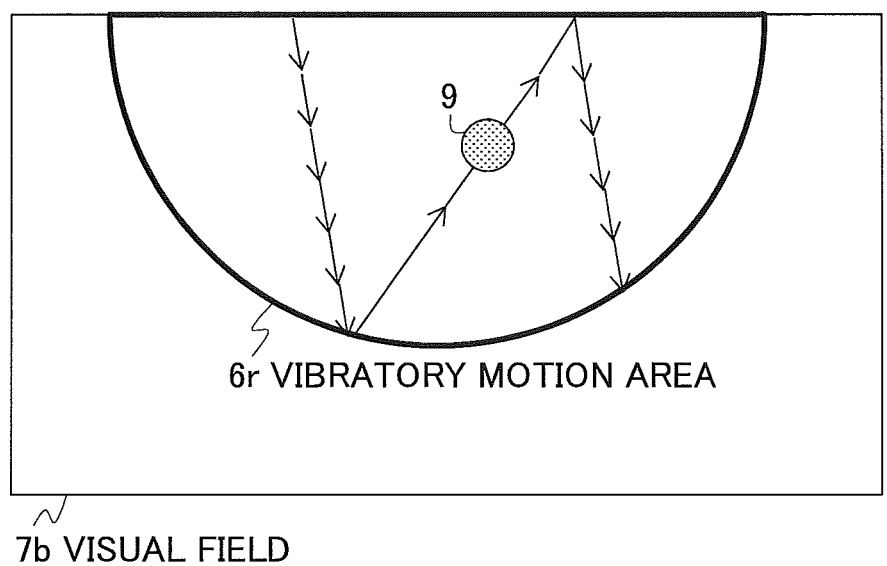
FIG. 25 is a diagram for explaining a movement change example in a vibratory motion area in the fifth embodiment.

FIG. 25 is a diagram for explaining a movement change example in the vibratory motion area in the fifth embodiment. In FIG. 25, the vibratory motion area 6r is the half circle as the same as that in FIG. 23A. Depending on whether the surface where the guidance icon 9 collides is the boundary of the visual field 7b or is the boundary of the vibratory motion area 6r corresponding to a periphery of the half circle, the reflection coefficient is indicated.

For the reflection coefficient with respect to the collision at the boundary between the visual field 7b and the vibratory motion area 6r, a higher value is selected than the reflection coefficient at the boundary (a line through a center of the vibratory motion area 6r of a half circle shape) of the visual field 7b. By changing the movement amount after the guidance icon 9 collides based on the reflection coefficient, an irregular motion is represented. Hence, the visual line of the operator 2 is easily guided.

Sixth Embodiment

The guidance support image generation process in the sixth embodiment will be described. In the sixth embodiment, the rotation of the guidance icon 9 in a two dimensional surface may be considered as the visual effect corresponding to the vibration. Instead of the movement amount of the guidance icon 9, the rotation angles are defined.

Figure 26:
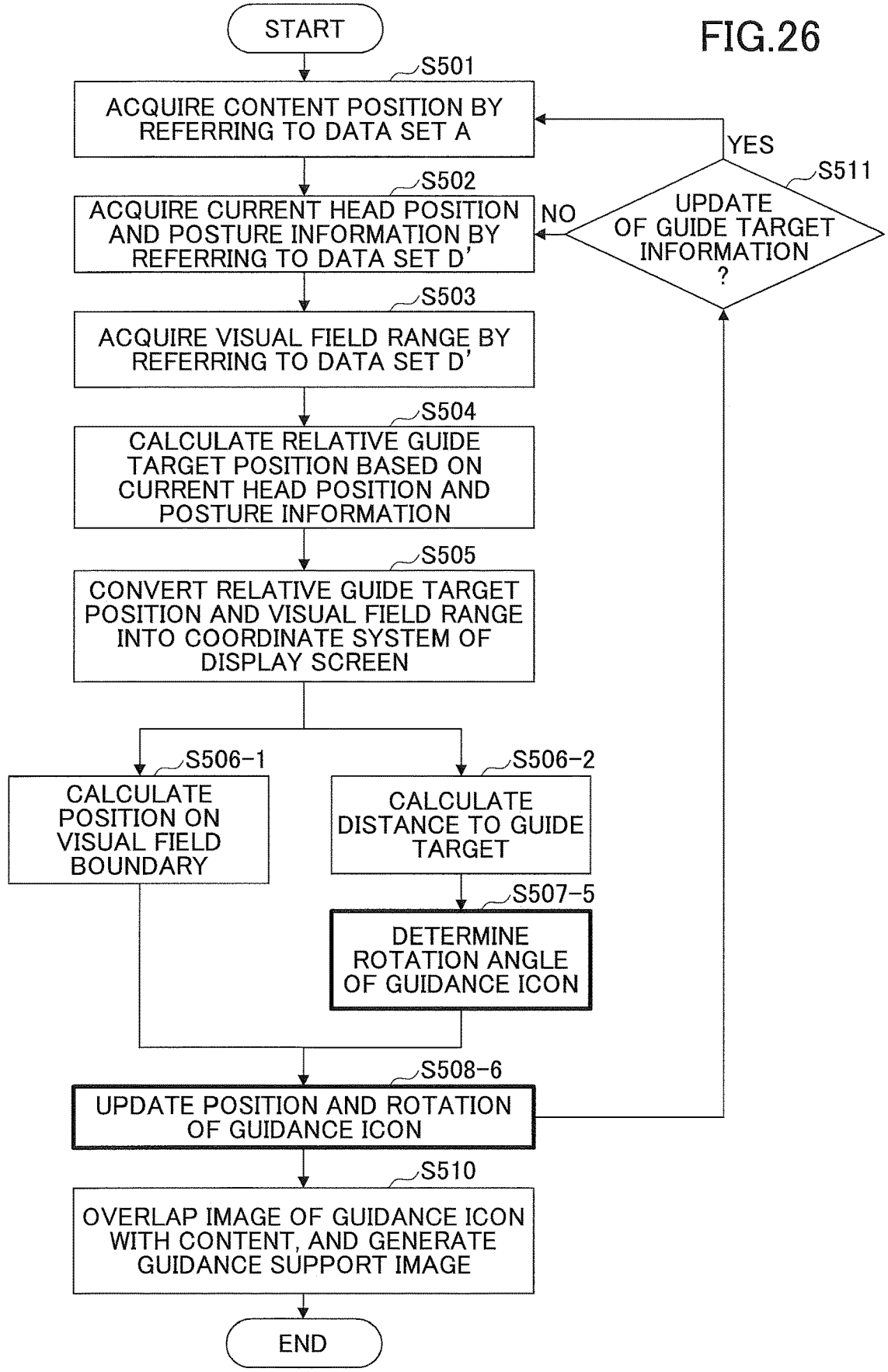
FIG. 26 is a flowchart for explaining the guidance support image generation process in a sixth embodiment.

FIG. 26 is a flowchart for explaining the guidance support image generation process in the sixth embodiment. In the guidance support image generation process in the sixth embodiment, steps different from the guidance support image generation process (FIG. 21) in the third embodiment will be described. Steps that are the same as the those in the third embodiment are designated by the same reference numerals, and explanations thereof will be omitted. In FIG. 26, steps S507-5 and S508-6 are different from the third embodiment. Step S507-1 in the first embodiment is omitted, similar to the third embodiment.

The guidance icon position calculation part 272a determines the rotation angle of the guidance icon 9 (step S507-5). Depending on the change of the distance L between the guidance target 8t and the visual field center, the rotation angle is increased or decreased. After that, the guidance icon position calculation part 272a updates the position and the rotation of the guidance icon 9 (step S508-6).

FIG. 27A and FIG. 27B are diagrams illustrating examples of the shapes and the rotations of the guidance icon. FIG. 27A depicts examples of various shapes of the guidance icon 9. The shape of the guidance icon 9 is not limited to these shapes, and any shape may be applied. In a case of a perfect circle, it may be desired to displace a rotation center from a barycenter.

FIG. 27B depicts various rotation examples. When the rotation center is set at the barycenter, a case of a greater rotation angle (left) and a case of a smaller rotation angle (center) are not in the same view.

The rotation center may not be set at the barycenter, and may be set at any position regardless of inside or outside the shape of the guidance icon 9. In a case in which the shape of the guidance icon 9 is a rectangle, the rotation center may be set in a vicinity of an apex (right).

Seventh Embodiment

The guidance support image generation process in the seventh embodiment will be described. In the guidance support image generation process in the seventh embodiment, multiple vibration methods are combined by using the movement amount and the rotation of the guidance icon 9 as other parameters. In the seventh embodiment, the fourth embodiment and the sixth embodiment are combined. Steps that are the same as those in any one of the guidance support image generation processes in the first embodiment, the fourth embodiment, and the sixth embodiment are designated by the same reference numerals, and explanations thereof will be omitted.

Figure 28:
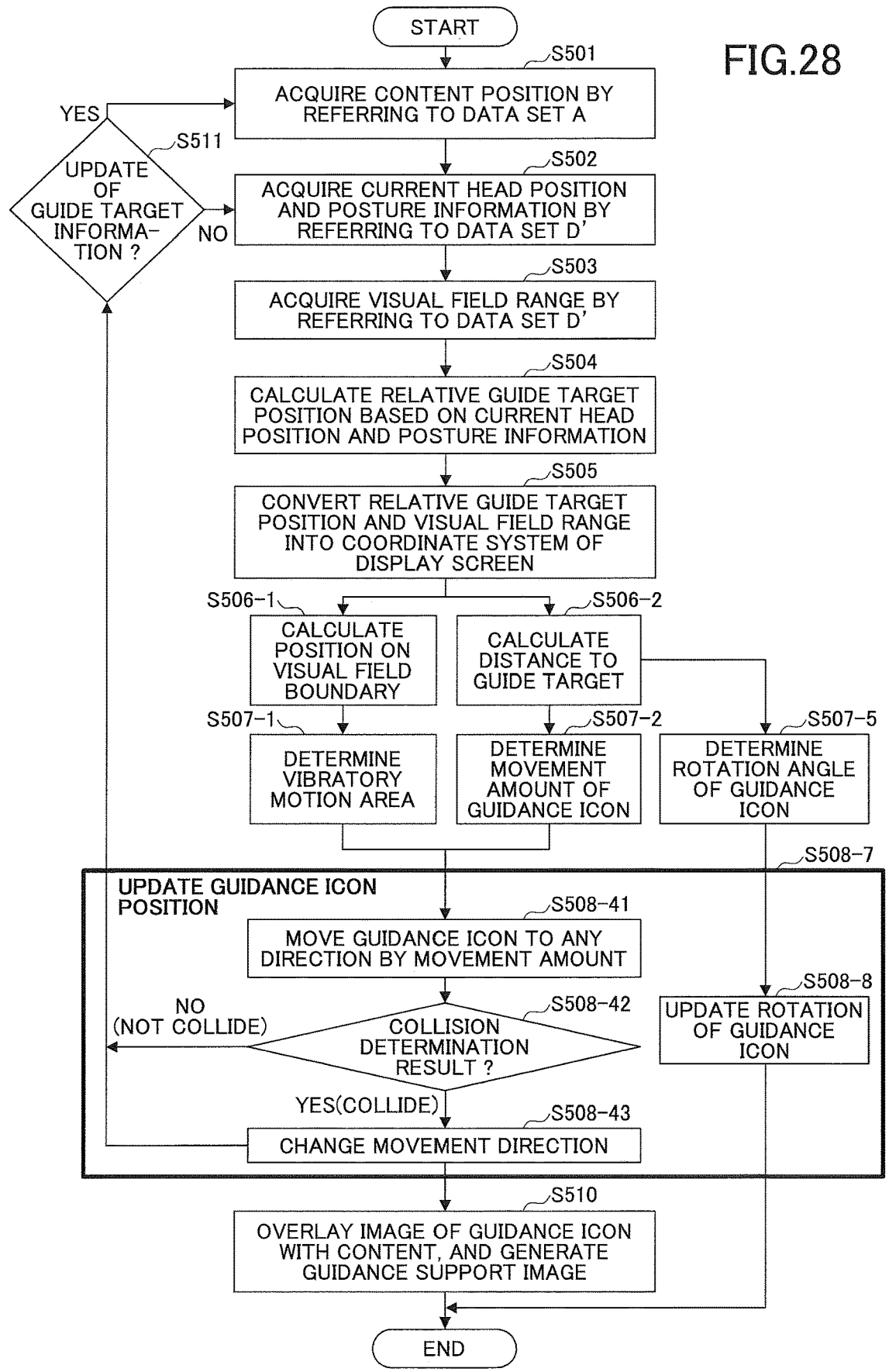
FIG. 28 is a flowchart for explaining the guidance support image process in a seventh embodiment.

FIG. 28 is a flowchart for explaining the guidance support image process in the seventh embodiment. In the guidance support image process in the seventh embodiment, after the distance L from the visual field center to the guidance target 8t (step S506-2), the movement amount of the guidance icon 9 is determined based on the distance L (step S507-2), and the rotation angle of the guidance icon 9 is determined (step S507-5).

After that, in the seventh embodiment, when the position of the guidance icon 9 is updated (step S508-7), the guidance icon 9 is moved by the movement amount determined in steps S506-2 and S507-2, and the movement direction is changed (steps S508-41 to S508-43) in the vibratory motion area 6r determined in steps S506-1 and S507-1. Also, the rotation of the guidance icon 9 is updated by the rotation angle determined in steps S506-2 and S507-5 (step S508-8).

Accordingly, in the guidance support image generation process in the seventh embodiment, the guidance support image, which represents the guidance icon 9 moving with rotation in the vibratory motion area 6r, is generated (step S510).

Next, a case, in which an initial operation process of the guidance icon 9 is added in order for the operator 2 to surely recognize the guidance icon 9 when the instructor 1 indicates the guidance target 8t, will be described from an eighth embodiment to a tenth embodiment.

Eighth Embodiment

The guidance support image generation process in the eighth embodiment will be described. In the eighth embodiment, the initial operation process of the guidance icon 9 is added when the guidance icon 9 is moved from the visual field center to the guidance target 8t.

Figure 29A:
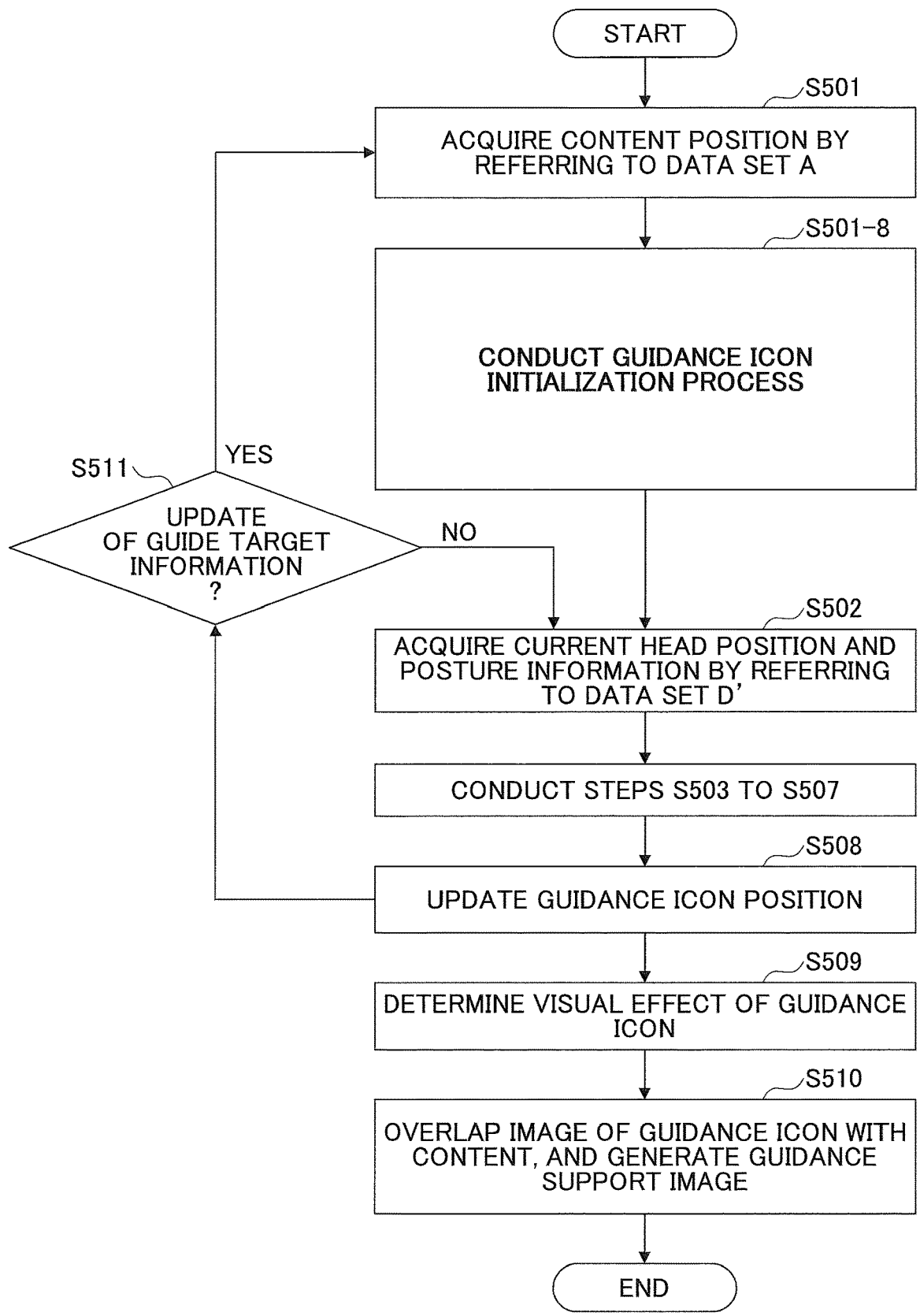
FIG. 29A and FIG. 29B are flowcharts for explaining the guidance support image generation process in an eighth embodiment.
Figure 29B:
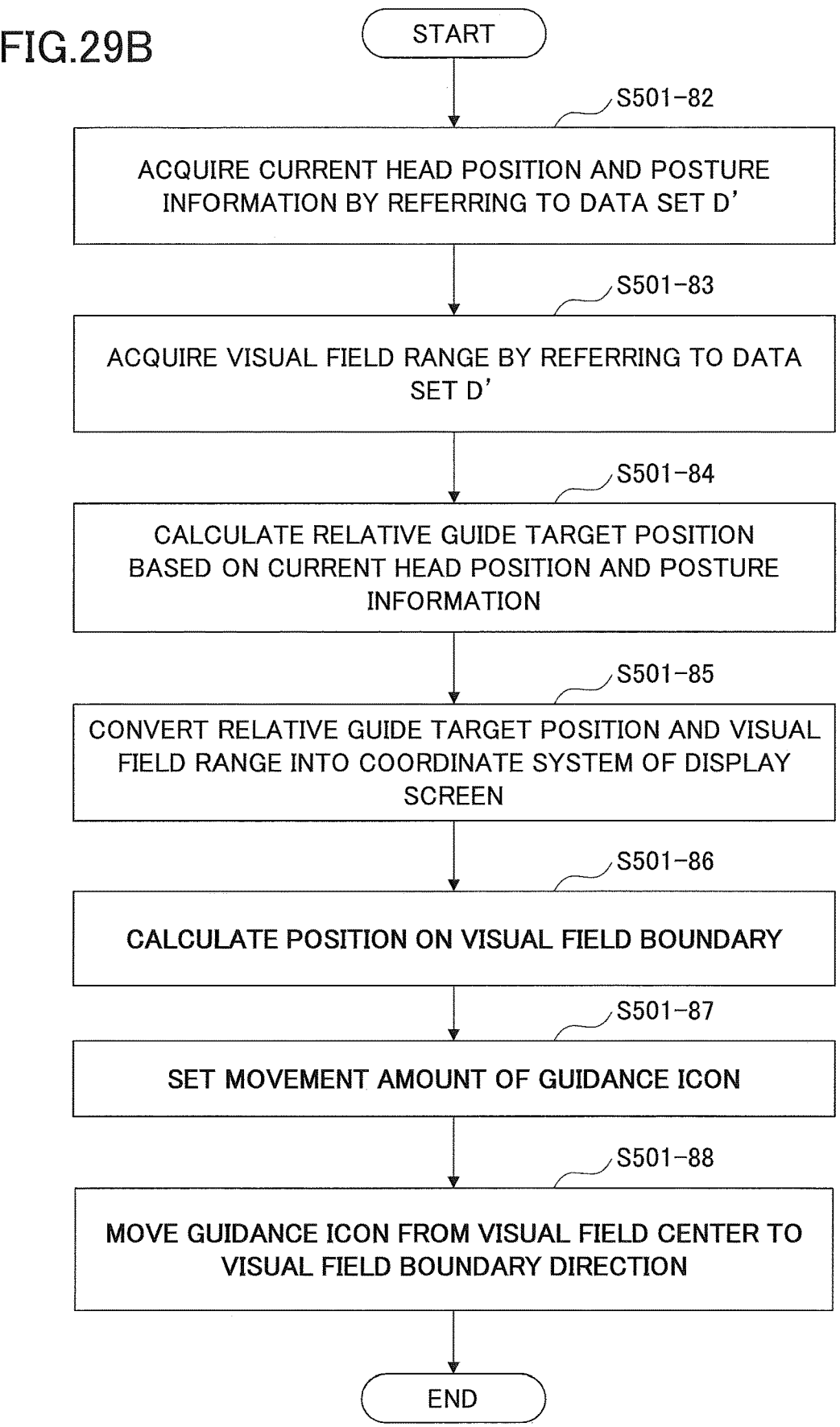

FIG. 29A and FIG. 29B are flowcharts for explaining the guidance support image generation process in the eighth embodiment. In the guidance support image generation process in the eighth embodiment, steps different from the guidance support image generation processes from the first embodiment to the seventh embodiment will be described. Steps that are the same as the those from the first embodiment to the seventh embodiment are designated by the same reference numerals, and explanations thereof will be omitted.

In the guidance support image generation process in the eighth embodiment, referring to FIG. 29A, between step S501 and step S502, the initial operation process of the guidance icon 9 is conducted (step S501-8). A process of step S501-8 will be described below.

Referring to FIG. 29A and FIG. 29B, in the initial operation process of the guidance icon 9 (step S501-8), steps S501-82, S501-83, S501-84, and S501-85 conducted by the guidance icon position calculation part 272a correspond to steps S502, S503, S504, and S505 (FIG. 15), respectively.

When the relative guidance target position and the visual field range in the coordinate system of the display screen at the display device 21d are acquired, the guidance icon position calculation part 272a calculates the position on the boundary of the visual field 7b dependent on the relative guidance target position (step S501-86), and the distance L from the visual field center to the guidance target 8t is set as the movement amount of the guidance icon 9 (step S501-87).

The guidance icon position calculation part 272a moves the guidance icon 9 in a direction from the visual field center to the visual field boundary (step S501-88). After that, the guidance icon position calculation part 272a conducts processes of step S502 to S511.

FIG. 30A through FIG. 30C are diagrams illustrating a movement example of the guidance icon in the eighth embodiment. In FIG. 30A through FIG. 30C, until the guidance target 8*t* appears in the visual field 7*b* of the operator 2 immediately after the instructor 1 indicates the guidance target 8*t*, the movements of the guidance icon 9 depending on the head movement of the operator 2 at the work site are exemplified. In FIG. 30A through FIG. 30C, a display example of the panorama image 4 of the remote support apparatus 101 is illustrated at left, and the visual field 7*b* from the display device 21*d* of the operator 2 is exemplified at right.

FIG. 30A depicts a state immediately after the operator 1 indicates the guidance target 8*t* on the panorama image 4 of the remote support apparatus 101. The guidance target 8*t* is in a lower right direction from the current visual field 7*b* of the operator 2. By the instructor 1 indicating the guidance target 8*t*, at the display device 21*d* of the operator 2, the guidance icon 9 is displayed at the center of the visual field 7*b*. After that, the guidance icon 9 moves from the center to the lower right direction along the movement locus 7*q* while vibrating faster.

In FIG. 30B, the operator 2 tracks the guidance icon 9, which moves from the center to the lower right direction while vibrating faster. In association with the head movement, the visual field 7*b* of the operator 2 depicted on the panorama image 4 of the remote support apparatus 101 moves toward the lower right direction.

When the operator 2 moves the head to the lower right direction, and approaches the guidance target 8*t*, the guidance icon 9 vibrates slower than the initial operation in FIG. 30A at the display device 21*d* of the operator 2.

FIG. 30C depicts, at left, a location of the visual field 7*b* of the operator 2 in the panorama image 4 of the remote support apparatus 101, when the operator 2 reaches the guidance target 8*t*. The guidance target 8*t* is located at the center of the visual field 7*b*.

In the display device 21*d* of the operator 2 at right in FIG. 30C, the guidance icon 9, which is vibrating at the lower right in the visual field 7*b* in FIG. 30B, slowly moves back to the center of the visual field 7*b*, and disappears.

Ninth Embodiment

The guidance support image generation process in a ninth embodiment will be described. In the guidance support image generation process in the ninth embodiment, the visual effect of the guidance icon 9 is adjusted depending on the distance to the guidance target 8*t*.

Figure 31:
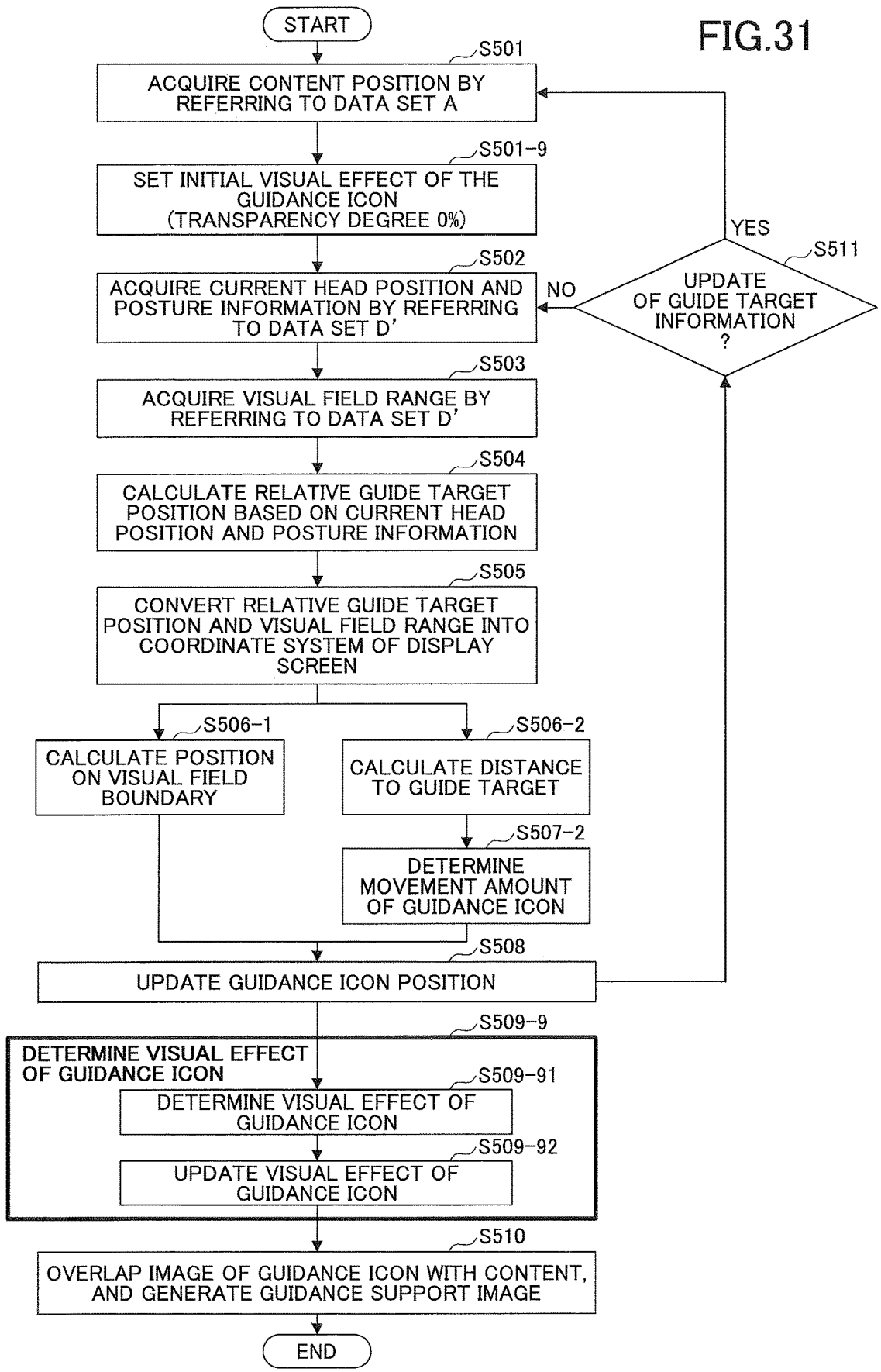
FIG. 31 is a flowchart for explaining the guidance support image generation process in a ninth embodiment.

FIG. 31 is a flowchart for explaining the guidance support image generation process in the ninth embodiment. In the guidance support image generation process in the ninth embodiment, steps different from the guidance support image generation processes from the first embodiment to the seventh embodiment will be described. Steps that are the same as the those from the first embodiment to the seventh embodiment are designated by the same reference numerals, and explanations thereof will be omitted.

In the guidance support image generation process in the ninth embodiment, the content position is acquired by referring to the data set A (step S501), the guidance icon visual effect determination part 272*b* sets an initial visual effect of the guidance icon 9 (step S501-9). Since the distance L is greater, the transparency of the guidance icon 9 may be set to 0%, that is, a background image is not completely pervious. Alternatively, the outline of the guidance icon 9 may be set to be sharpened or the like.

When the position of the guidance icon 9 is updated by the processes of steps S503 to S508, the guidance icon visual effect determination part 272*b* conducts a guidance icon visual effect determination process in the ninth example (step S509-9).

The guidance icon visual effect determination part 272*b* refers to the distance L calculated in step S506-2, and determines the visual effect of the guidance icon described with reference to FIG. 32A through FIG. 32C (step S509-91). The guidance icon visual effect determination part 272*b* updates the visual effect of the guidance icon 9 with the determined visual effect (step S509-92).

Figure 32A:
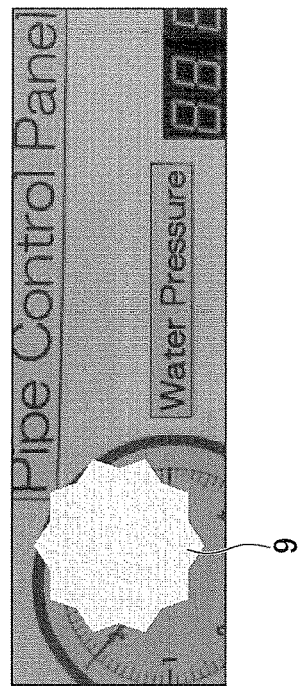
FIG. 32A through FIG. 32C are diagrams for explaining variations of the visual effects of the guidance icon.
Figure 32C:
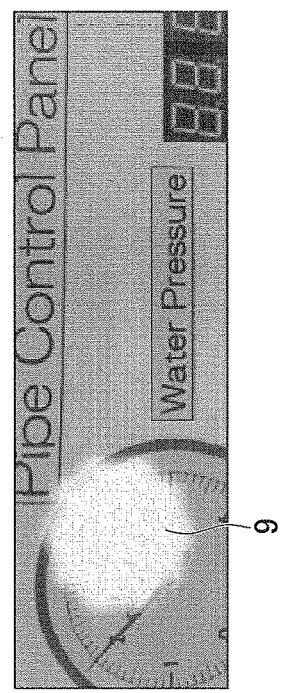
Figure 32B:
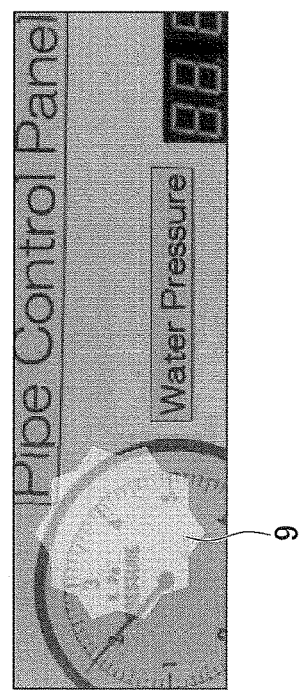

FIG. 32A through FIG. 32C are diagrams for explaining variations of the visual effects of the guidance icon. FIG. 32A depicts an initial display state of the guidance icon 9, in which the distance L to the guidance target 8*t* is longer than a predetermined distance. The guidance icon 9 is clearly displayed with the 0% transparency at the display device 21*d*.

FIG. 32B depicts a display example in which the transparency of the guidance icon 9 is increased, when the head of the operator 2 approaches a direction of the guidance target 8*t*, or when the distance L to the guidance target 8*t* is less than the predetermined distance at an initial state.

FIG. 32C depicts a display example, in which the outline of the guidance icon 9 is set to blur, when the head of the operator 2 approaches a direction of the guidance target 8*t*, or when the distance L to the guidance target 8*t* is less than the predetermined distance at an initial state.

FIG. 32B and FIG. 32C illustrate examples of changing the visual effect so as to reduce a presence of the guidance icon 9.

Tenth Embodiment

The tenth embodiment will be described, in which the guidance icon 9 is set to quickly vibrate the guidance icon 9, regardless of the distance L to the guidance target 8*t*. In the tenth embodiment, the movement amount of the guidance icon 9 in the initial operation process is controlled within a range of the movement amount corresponding to approximately upper limit of speed recognizable for the human to see the vibration at a peripheral vision. When a change to a direction of the guidance target 8*t* of the head posture of the operator 2 is detected, a regular position calculation process for the guidance 9 is conducted in order to determine the movement amount of the guidance icon 9 depending on the distance L.

Figure 33A:
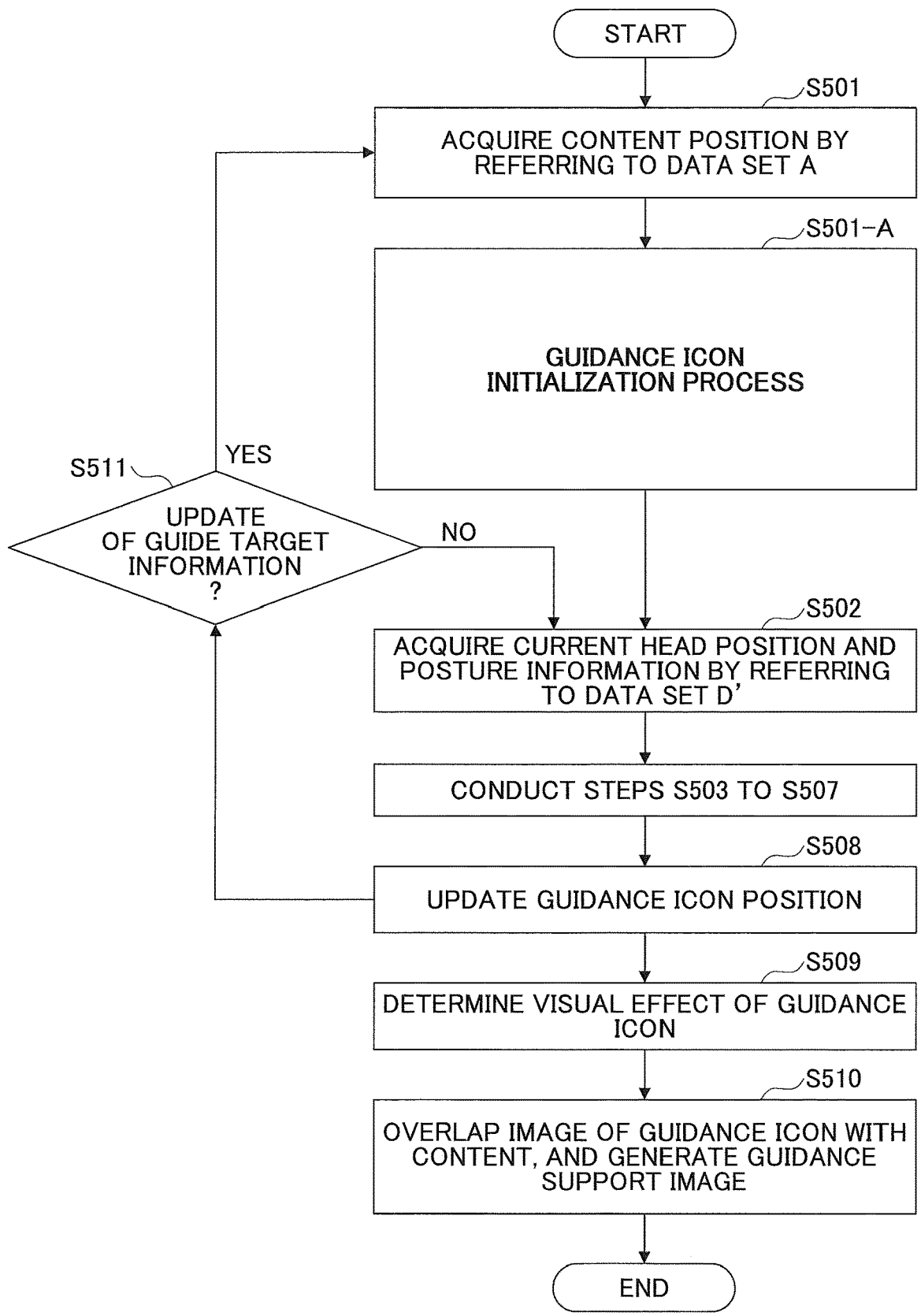
FIG. 33A and FIG. 33B are flowcharts for explaining the guidance support image generation process in a tenth embodiment.
Figure 33B:
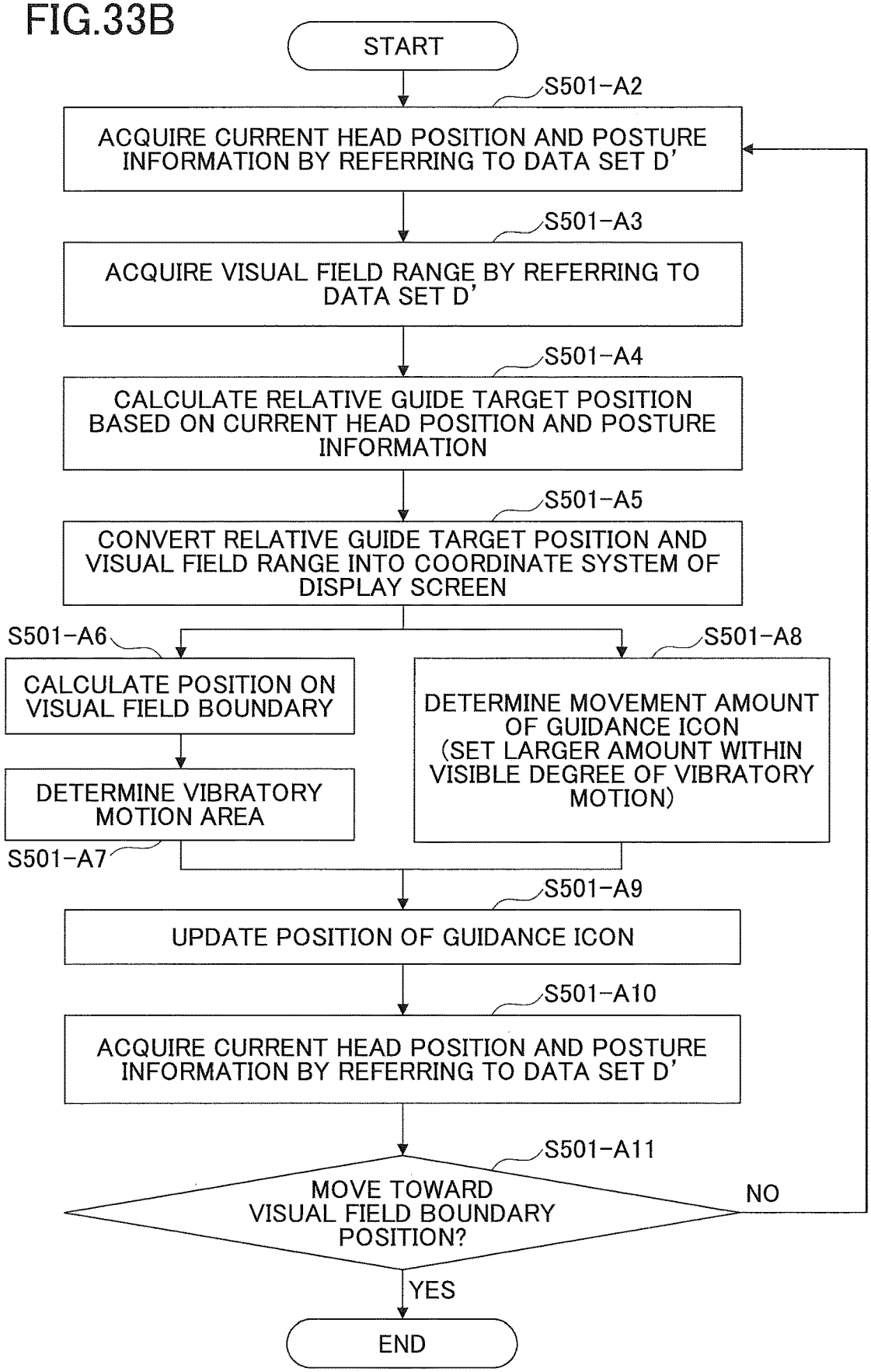

FIG. 33A and FIG. 33B are flowcharts for explaining the guidance support image generation process in the tenth embodiment. In the guidance support image generation process in the tenth embodiment, steps different from the guidance support image generation processes from the first embodiment to the eighth embodiment will be described. Steps that are the same as the those from the first embodiment to the eighth embodiment are designated by the same reference numerals, and explanations thereof will be omitted.

In the guidance support image generation process in the tenth embodiment, referring to FIG. 33A, similar to the eighth embodiment, between step S501 and step S502, the initial operation process of the guidance icon 9 is conducted (step S501-A). In this flowchart, a process in step S501-A alone will be described.

In the initial operation process of the guidance icon 9 (step S501-A), steps S501-A2, S501-A3, S501-A4, and S501-A5 conducted by the guidance icon position calculation part 272a correspond to steps S502, S503, S504, and S505 (FIG. 15) in the first embodiment.

The guidance icon position calculation part 272a calculates a position of the boundary of the visual field 7b depending on the relative guidance target position (step S501-A6), and determines the vibratory motion area 6r (step S501-A7).

The guidance icon position calculation part 272a determines the movement amount of the guidance icon 9 (step S501-A8). In this initial operation process of the guidance icon 9, the vibration of the guidance icon 9 is set to a greater value within a visible range. By quickly vibrating the guidance icon 9, it is possible to easily attract the visual line of the operator 2.

The guidance icon position calculation part 272a updates the position of the guidance icon 9 within the vibratory motion area 6r (step S501-A9), acquires the current head position and posture information by referring to the data set D' (step S501-A10), and determines whether the current head position and posture information indicates moving toward the visual field boundary (step S501-A11).

When the current head position and posture information does not indicate moving toward the visual field boundary (NO of step S501-A11), the guidance icon position calculation part 272a goes back to step S501-A2, and repeats the above described processes in the same manner. On the other hand, when the current head position and posture information indicates moving toward the visual field boundary (YES of step S501-A11), the guidance icon position calculation part 272a terminates this guidance icon position calculation process, to conduct the regular position calculation process for the guidance icon 9 in order to determine the movement amount of the guidance icon 9 depending on the distance L.

Eleventh Embodiment

An eleventh embodiment, in which the visual effect of the guidance icon 9 is determined by the guidance icon visual effect determination part 272b, will be described.

Figure 34:
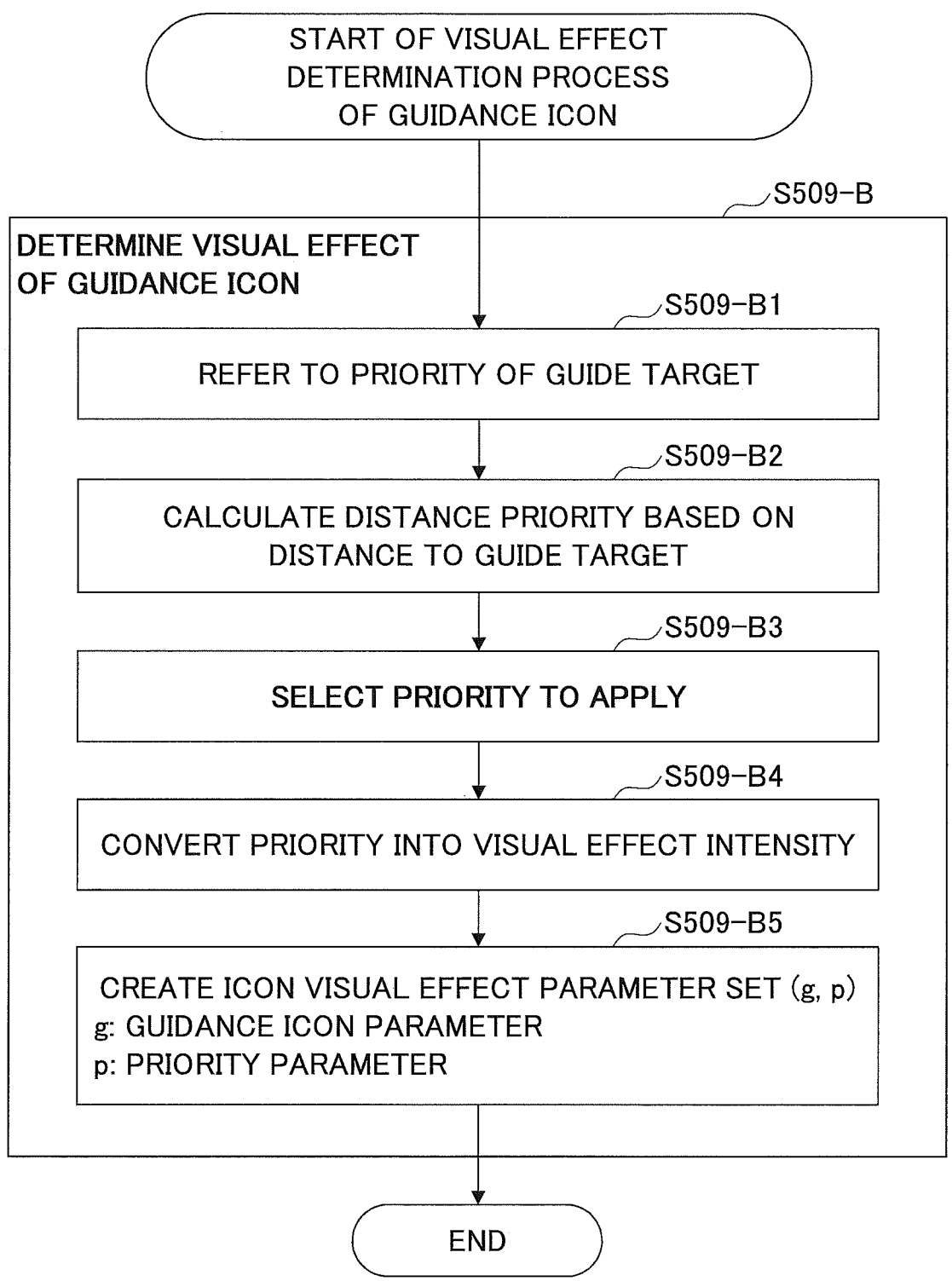
FIG. 34 is a flowchart for explaining the guidance icon visual effect determination process in an eleventh embodiment.

FIG. 34 is a flowchart for explaining the guidance icon visual effect determination process in the eleventh embodiment. In the guidance icon visual effect determination process in the eleventh embodiment, the guidance icon visual effect determination part 272b refers to the priority of the guidance target 8t (step S509-B1).

The guidance icon visual effect determination part 272b refers to the distance to the guidance target 8t, and calculates a distance priority based on information of the distance (step S509-B2). After that, the guidance icon visual effect determination part 272b selects either one of the priority acquired in step S509-B1 and the distance priority calculated in step S509-B2 (step S509-B3). The distance priority is determined based on the distance from the current location to the guidance target 8t. The closer from the current location the guidance target 8t is, the higher the priority of the guidance target 8t is set to be.

The guidance icon visual effect determination part 272b converts the priority into a visual effect intensity (step S509-B4). The priority of the visual effect intensity is given by a priority parameter p in the icon visual effect parameters. The guidance icon visual effect determination part 272b creates the icon visual effect parameter set (g, p) (step S509-B5). The icon visual effect parameter set indicates a guidance icon parameter g and a priority parameter p.

Figure 35B:
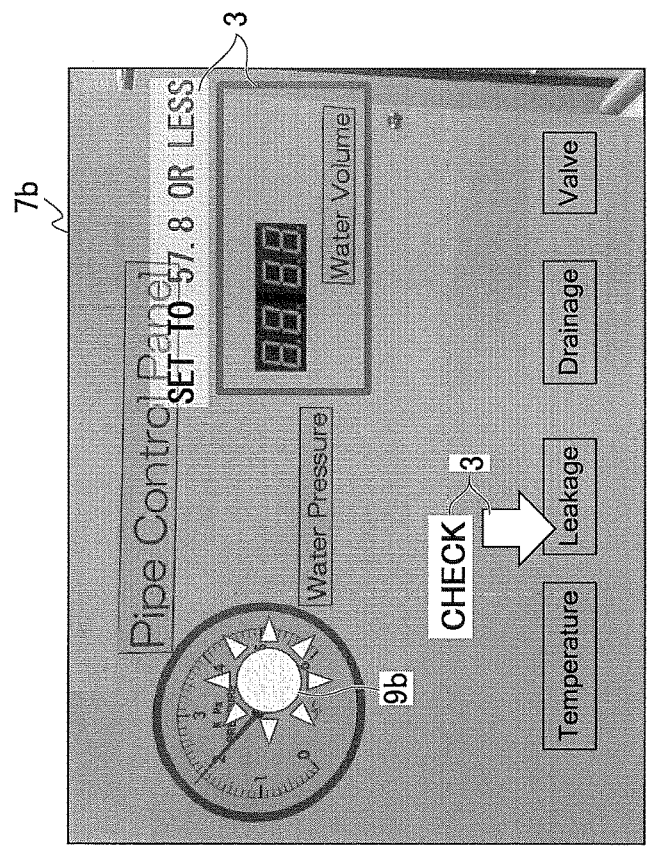
FIG. 35A and FIG. 35B are diagrams illustrating display examples of the guidance icon depending on whether the eleventh embodiment is applied.
Figure 35A:
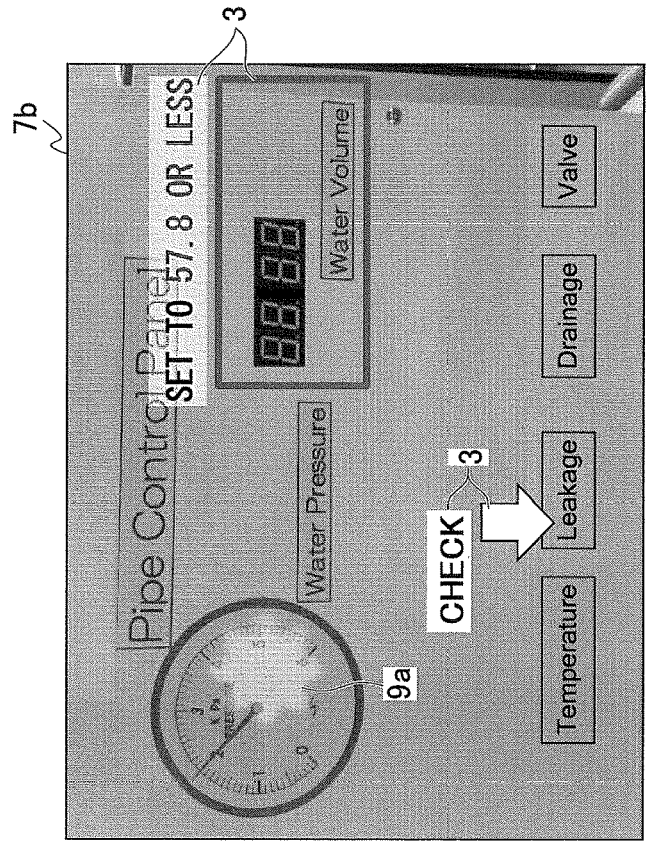

FIG. 35A and FIG. 35B are diagrams illustrating display examples of the guidance icon depending on whether the eleventh embodiment is applied. FIG. 35A depicts a display example of the guidance icon 9a in a case in which the eleventh embodiment is applied. The priority of the guidance icon 9a is represented by the definition and the transparency. The guidance icon 9a is transparently displayed with an opaque outline.

On the other hand, FIG. 35B depicts a display example of a guidance icon 9b in a case in which the eleventh embodiment is not applied. A shape of the guidance icon 9b is the same as that of the guidance icon 9a, but is displayed with the opaque outline and no-transparency.

Figure 36B:
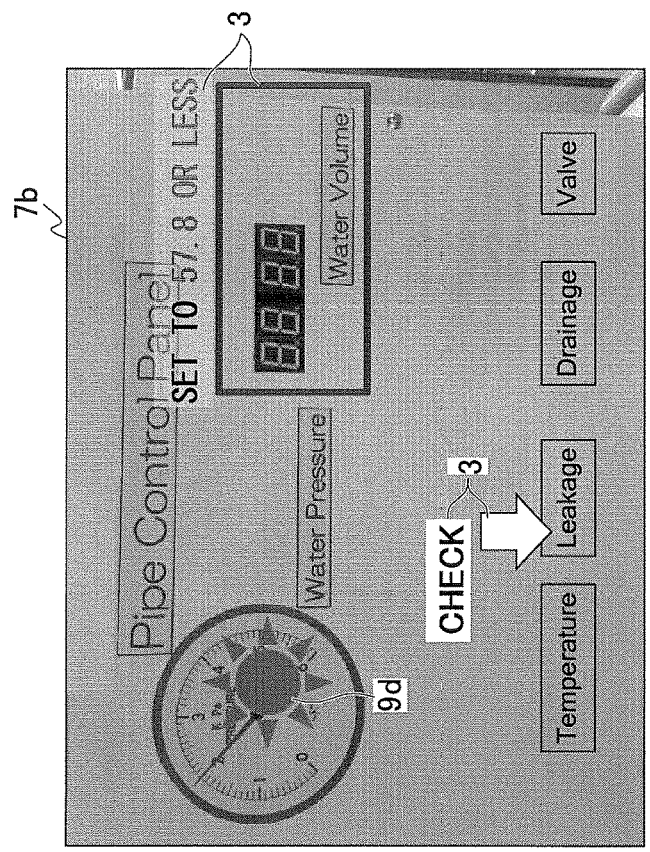
FIG. 36A and FIG. 36B are diagrams illustrating other display examples in a case in which the eleventh embodiment is applied
Figure 36A:
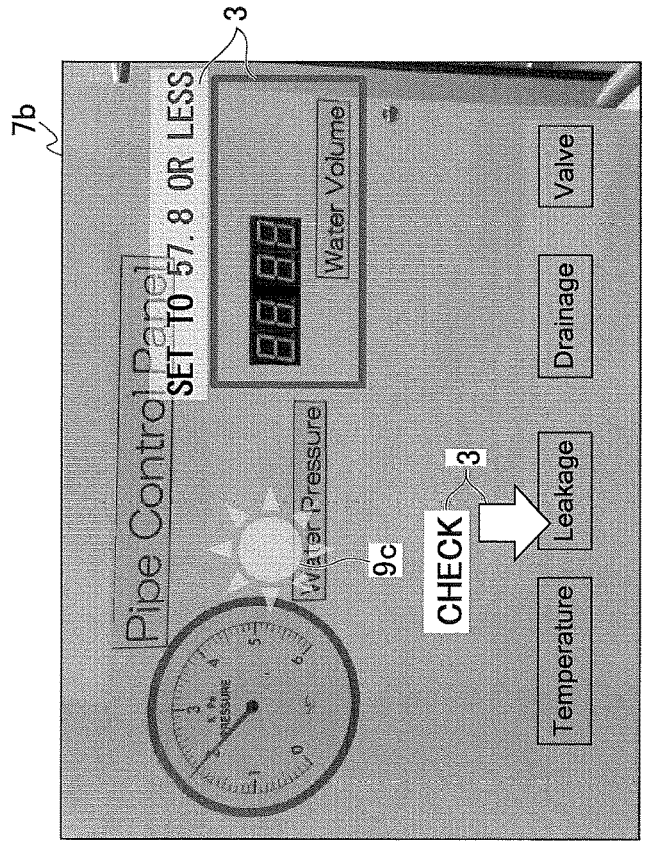

A case, in which the definition and the transparency are determined as the parameters of the visual effect of the guidance icon (icon visual effect parameters), is described above in FIG. 35A. Other display examples will be described below. FIG. 36A and FIG. 36B are diagrams illustrating other display examples in a case in which the eleventh embodiment is applied.

FIG. 36A depicts an example in which the eleventh embodiment is applied and the transparency alone is indicated by the icon visual effect parameter. The guidance icon 9c is displayed by increasing the transparency so that back ground letters "Water Pressure" is readable.

In a case in which the eleventh embodiment is applied in FIG. 36B, a coloration tendency is differently set between the contents 3 and the guidance icon 9d. Content information by the coloration tendency in a cool color system may be prepared beforehand in the content DB 283, and the like. The parameter for the guidance icon 9 may be determined so that the coloration tendency in a warm color system is used for the guidance icon 9d.

Twelfth Embodiment

The priority will be described in a case of displaying the multiple guidance icons 9 by the guidance icon visual effect determination part 272b.

Figure 37B:
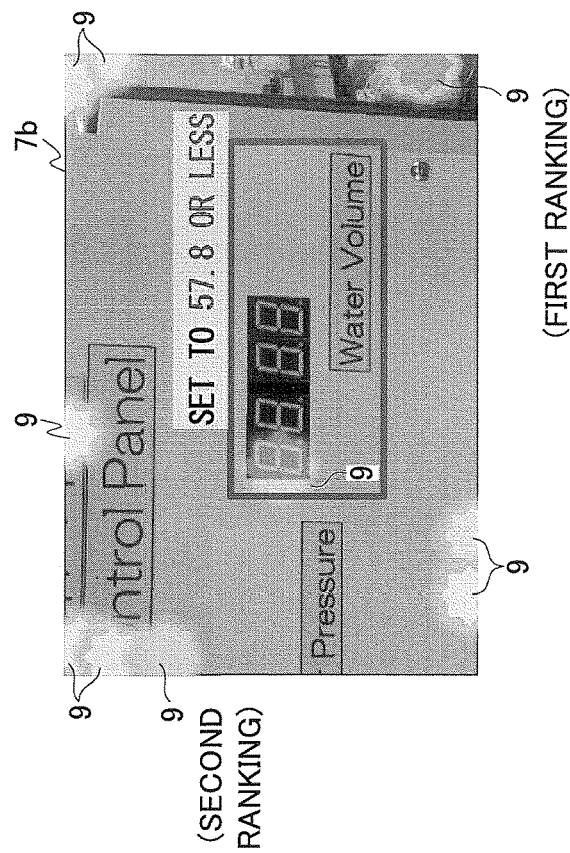
FIG. 37A and FIG. 37B are diagrams illustrating display examples of the guidance icon whether a twelfth embodiment is applied.
Figure 37A:
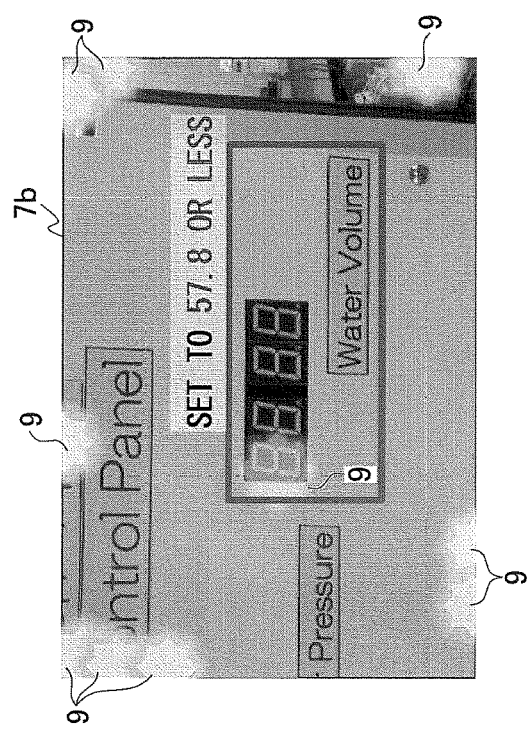

FIG. 37A and FIG. 37B are diagrams illustrating display examples of the guidance icon when a twelfth embodiment is applied. FIG. 37A depicts a display example in a case in which the priority is not applied to the multiple guidance icons 9. In a case, all the multiple guidance icons 9 are displayed with the same color, the same transparency, and the same size.

On the other hand, FIG. 37B depicts a display example in a case in which the priority is set to the multiple guidance icons 9. In this example, a hue difference indicates a different priority. Based on the priority due to the hue as depicted in FIG. 9, the guidance icon 9 of red is the first ranking, the guidance icon 9 of orange is the second ranking, and other guidance icons 9 are the same ranking.

The multiple guidance icons 9 may be deleted from ones, which become unnecessary to display. A determination criterion to delete the multiple guidance icons 9 may be appropriately defined based on an application example such as whether the guidance is completed, whether a relevant operation is completed, applying a right to delete to the instructor at the remote place, or the like.

Other examples for distinguishably displaying the priority for the multiple guidance icons 9 will be described with reference to FIG. 38A through FIG. 38C. FIG. 38A through FIG. 38C are diagrams illustrating other display examples of the priority for the multiple guidance icons 9. The priority may be indicated for the multiple guidance icons 9 as follows:

outline

The higher the priority is, the clearer the outline of the guidance icon 9 is defined. FIG. 38A corresponds to this example.

brightness or saturation of color

Similar to the hue, for the guidance icon 9 having a higher priority, the brightness or the saturation of color is set with a greater difference from the reference of the brightness or the saturation of the color. FIG. 38B corresponds to this example.

transparency

The higher the priority is, the lower the transparency is set for the guidance icon 9. The lower the priority is, the higher the transparency is set for the guidance icon 9.

texture

The higher the priority is, the rougher the texture is set for the guidance icon 9. The lower the priority is, the finer the texture is set for the guidance icon 9.

Also, the text may be defined as the texture. The priority may be indicated for the guidance icon 9 by a numeral, a letter, or the like. The following example will be depicted.

Example 1

From the guidance icons 9 having a higher priority, the numeral is applied such as 1, 2, 3, . . . , or the like in a certain order. FIG. 38C corresponds to this example.

Example 2

From the guidance icons 9 having the higher priority, the letter is applied such as A, B, C, . . . , or the like in a certain order.

Example 3

From the guidance icons 9 having the higher priority, a symbol is applied such as α, β, γ, . . . , or the like in a certain order.

movement (vibration or the like)

The vibration speed may be increased proportionally to a degree of the priority. However, if the vibration speed is too fast, it is difficult for the human eyes to recognize the vibration. The vibration speed may be increased in the range in which the vibration is recognizable.

The above described first embodiment through the twelfth embodiment are not limited to displaying of the guidance icon 9 at the display device 21d. Other utilizations may be applicable in the following various states:

<Utilization 1> Navigation While Walking on a Street Using a Smart Phone, a Tablet Terminal, or the Like Overlying and displaying the guidance information toward target information while acquiring an appearance of the street at real time by a camera.

The guidance instruction is conducted by a navigation system, instead of a user (the instructor 1 or the like) at the remote place.

Any one of the first embodiment through the twelfth embodiment may be applied between users.

<Utilization 2> Car Navigation

In a visual field at a time of driving a car, the guidance information may be overlapped at a front glass.

During driving a car, there are may operations and checks of safe conditions. Hence, the cognitive load is great. Even for a case of checking a car navigation screen, by installing an intuitive display according to the first embodiment to the twelfth embodiment, it is possible to reduce a load of driving operations. Accordingly, a driver smoothly arrives at a target place.

<Utilization 3> Remote Communication

One of the first embodiment through the twelfth embodiment may be applied to a remote communication through a screen. One of the first embodiment through the twelfth embodiment may be applied to an application for video communication such as Skype (registered trademark) or the like.

In order to display the guidance information to share a visual field with a communication partner, one of the first embodiment through the twelfth embodiment may be used.

In the application for a video communication such as Skype (registered trademark) or the like, it becomes possible to view an appearance around the communication partner by using the camera of a terminal of the communication partner such as an internal camera, externally connectable type, or the like.

As an utilization example, it is possible to display the guidance information in order to move the terminal of the communication partner. In detail, in a state in which the target at a side of the communication partner, which comes up in conversation, is not captured by the camera of the terminal of the communication partner, if the distance and the direction to the target are known to a certain extent, the guidance information may be displayed in order for the camera of the communication partner to capture the target.

According to the first embodiment through the twelfth embodiment, it is possible to smoothly guide the user to the target.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A guidance support method performed by a computer, comprising:

detecting target information in space information of a real environment stored in a storage device;

measuring a device position of a display device in a space defined in the space information of the real environment, and measuring a target position of a target based on a relative position from a reference point defined in a visual field of the display device, the relative position being defined in the target information;

determining an icon position of an icon between two points on a line segment connecting a center of the visual field and the target position to be displayed on the display device, and determining a vibratory motion of the icon based on the measured device position and the measured target position;

displaying the icon performing the determined vibratory motion at the determined icon position on the display device; and changing the icon position and the vibratory motion of the icon displayed on the display device depending on a change of the device position, wherein the icon moving and being vibrated on the line segment is displayed on the display device.

2. The guidance support method according to claim 1, wherein the computer controls the vibratory motion of the icon to be slower when the display device is approaching the target.

3. The guidance support method according to claim 2, wherein the computer sets an area to move the icon with the vibratory motion at a boundary of the visual field in a direction toward the target position, when the target is outside the visual field of the display device.

4. The guidance support method according to claim 3, wherein the computer
conducts a collision determination with respect to the boundary of the area by moving the icon position in the area, and
reverses a movement direction of the icon with the vibratory motion when the icon collides with the boundary.

5. The guidance support method according to claim 3, wherein the computer
conducts a collision determination with respect to the boundary of the area by moving the icon position in the area, and
changes a movement direction of the icon with the vibratory motion when the icon collides with the boundary.

6. The guidance support method according to claim 3, wherein the computer
conducts a collision determination with respect to a periphery of the area by moving the icon position in the area,
selects a reflection coefficient at a time of a collision and correcting a movement amount of the icon depending on an object when the icon collides with the object, and
changes a movement direction of the icon with the vibratory motion when the icon collides with the periphery.

7. The guidance support method according to claim 3, wherein the computer controls the icon to vibrate in the area where the icon is moved at a time of an initial display of the icon on the display device.

8. The guidance support method according to claim 1, wherein the computer determines a rotation angle of the icon, and rotates the icon.

9. The guidance support method according to claim 1, wherein the computer controls the icon to blink.

10. The guidance support method according to claim 1, wherein the computer
selects one of a priority based on a distance from the display device for each of multiple targets and a rank of the priority defined in the target information,
converts the selected priority into one or more features of a visual effect, and
applies the one or more features of the visual effect based on the selected priority to each of the multiple targets by using a parameter set indicating the respective features of the visual effect.

11. The guidance support method according to claim 1, further comprising:
controlling the icon to move toward a boundary of the visual field at a side of the target position from the center of the visual field at a time of an initial display of the icon on the display device, in response to determining that the target is located outside the visual field based on the target information.

12. A non-transitory computer readable recording medium that stores a guidance support program that causes a computer to execute a process comprising:
detecting target information in space information of a real environment stored in a storage device;
measuring a device position of a display device in a space defined in the space information of the real environment, and measuring a target position of a target based on a relative position from a reference point defined in a visual field of the display device, the relative position being defined in the target information;
determining an icon position of an icon between two points on a line segment connecting a center of the visual field and the target position to be displayed on the display device, and determining a vibratory motion of the icon based on the measured device position and the measured target position;
displaying the icon performing the determined vibratory motion at the determined icon position on the display device; and
changing the icon position and the vibratory motion of the icon displayed on the display device depending on a change of the device position,
wherein the icon moving and being vibrated on the line segment is displayed on the display device.

13. The non-transitory computer readable recording medium according to claim 12, wherein the process further includes
controlling the icon to move toward a boundary of the visual field at a side of the target position from the center of the visual field at a time of an initial display of the icon on the display device, in response to determining that the target is located outside the visual field based on the target information.

14. A guidance support apparatus, comprising:
a memory; and
a processor coupled to the memory and the processor configured to perform
detecting target information in space information of a real environment stored in a storage device;
measuring a device position of a display device in a space defined in the space information of the real environment, and measuring a target position of a target based on a relative position from a reference point defined in a visual field of the display device, the relative position being defined in the target information;
determining an icon position of an icon between two points on a line segment connecting a center of the visual field and the target position to be displayed on the display device, and determining a vibratory motion of the icon based on the measured device position and the measured target position;
displaying the icon performing the determined vibratory motion at the determined icon position on the display device; and
changing the icon position and the vibratory motion of the icon displayed on the display device depending on a change of the device position,
wherein the icon moving and being vibrated on the line segment is displayed on the display device.

15. The guidance support apparatus according to claim 14, wherein the processor further performs
controlling the icon to move toward a boundary of the visual field at a side of the target position from the center of the visual field at a time of an initial display of the icon on the display device, in response to determining that the target is located outside the visual field based on the target information.

\* \* \* \* \*